US008541745B2

(12) United States Patent
Dickinson et al.

(10) Patent No.: US 8,541,745 B2
(45) Date of Patent: Sep. 24, 2013

(54) METHODS AND DEVICES FOR CLOTHING DETECTION ABOUT A WEARABLE ELECTRONIC DEVICE

(75) Inventors: Timothy Dickinson, Crystal Lake, IL (US); Rachid Mohsen Alameh, Crystal Lake, IL (US)

(73) Assignee: Motorola Mobility LLC, Libertyville, IL (US)

( * ) Notice: Subject to any disclaimer, the term of this patent is extended or adjusted under 35 U.S.C. 154(b) by 48 days.

(21) Appl. No.: 13/297,952

(22) Filed: Nov. 16, 2011

(65) Prior Publication Data

US 2013/0119255 A1 May 16, 2013

(51) Int. Cl.
*G01J 5/02* (2006.01)

(52) U.S. Cl.
USPC .......................................................... 250/340

(58) Field of Classification Search
USPC ......................... 250/338.1–338.5, 340, 341.8
See application file for complete search history.

(56) References Cited

U.S. PATENT DOCUMENTS

| | | | | |
|---|---|---|---|---|
| 5,625,697 | A | 4/1997 | Bowen et al. | |
| 7,959,567 | B2 * | 6/2011 | Stivoric et al. | 600/300 |
| 2008/0220831 | A1 | 9/2008 | Alameh et al. | |
| 2009/0312075 | A1 | 12/2009 | Kimbrell | |

FOREIGN PATENT DOCUMENTS

| | | | |
|---|---|---|---|
| GB | 2327012 | A | 1/1999 |
| WO | 0025193 | | 5/2000 |
| WO | 2009151650 | A2 | 12/2009 |

OTHER PUBLICATIONS

Van Laerhoven et al., "Multi-sensor context aware clothing," 2002, IEEE Proceedings of the 6$^{th}$ International Symposium on Wearable Computer, pp. 49-56.*

Oikawa, et al, "A New Echo Canceller Realized by High Performance Digital Signal Processer", IEEE, 1988, pp. 1329-1332.

* cited by examiner

*Primary Examiner* — Kiho Kim

(57) ABSTRACT

A method in a wearable electronic device of detecting clothing includes: detecting whether the wearable electronic device is coupled to a user, determining whether the wearable electronic device is covered, and adjusting one or more device settings of the wearable electronic device. A secondary check can perform an additional determination of whether the wearable electronic device is covered with clothing. One or more sensors, such as a skin sensor, a tension sensor, an infrared sensor, or microphones, can be used to execute the steps in the wearable electronic device.

20 Claims, 22 Drawing Sheets

METHODS AND DEVICES FOR CLOTHING DETECTION ABOUT A WEARABLE ELECTRONIC DEVICE

CROSS REFERENCE TO RELATED APPLICATIONS

This application is related to commonly assigned, U.S. application Ser. No. 13/297,662, entitled, "Display Device, Corresponding Systems, and Methods Therefor," Cauwels, et al., inventors, filed concurrently herewith, and U.S. application Ser. No. 13/297,965, entitled, "Display Device, Corresponding Systems, and Methods for Orienting Output on a Display," Dickinson, et al., inventors, filed concurrently herewith, which are incorporated by reference for all purposes.

BACKGROUND

1. Technical Field

This invention relates generally to electronic devices, and more particularly to wearable electronic devices.

2. Background Art

People are becoming more dependent upon portable electronic devices. Illustrating by example, a mobile telephone was once used only for making telephone calls. By contrast, people today rely upon "smart phones" to keep up with their calendars, address books, music collections, photo collections, and so forth. At the same time portable electronic devices are becoming more complex, their physical sizes and geometric form factors are becoming smaller. Modern portable electronic devices have developed to the point that it is common to have a small device that fits into a pocket and functions as a computing device, entertainment device, productivity device, and communication device.

These smaller, yet more powerful, devices are being used for many different applications in many different environments. It would be advantageous to be able to detect certain environments and adapt performance of an electronic device to better perform in a given environment.

Figure 1:
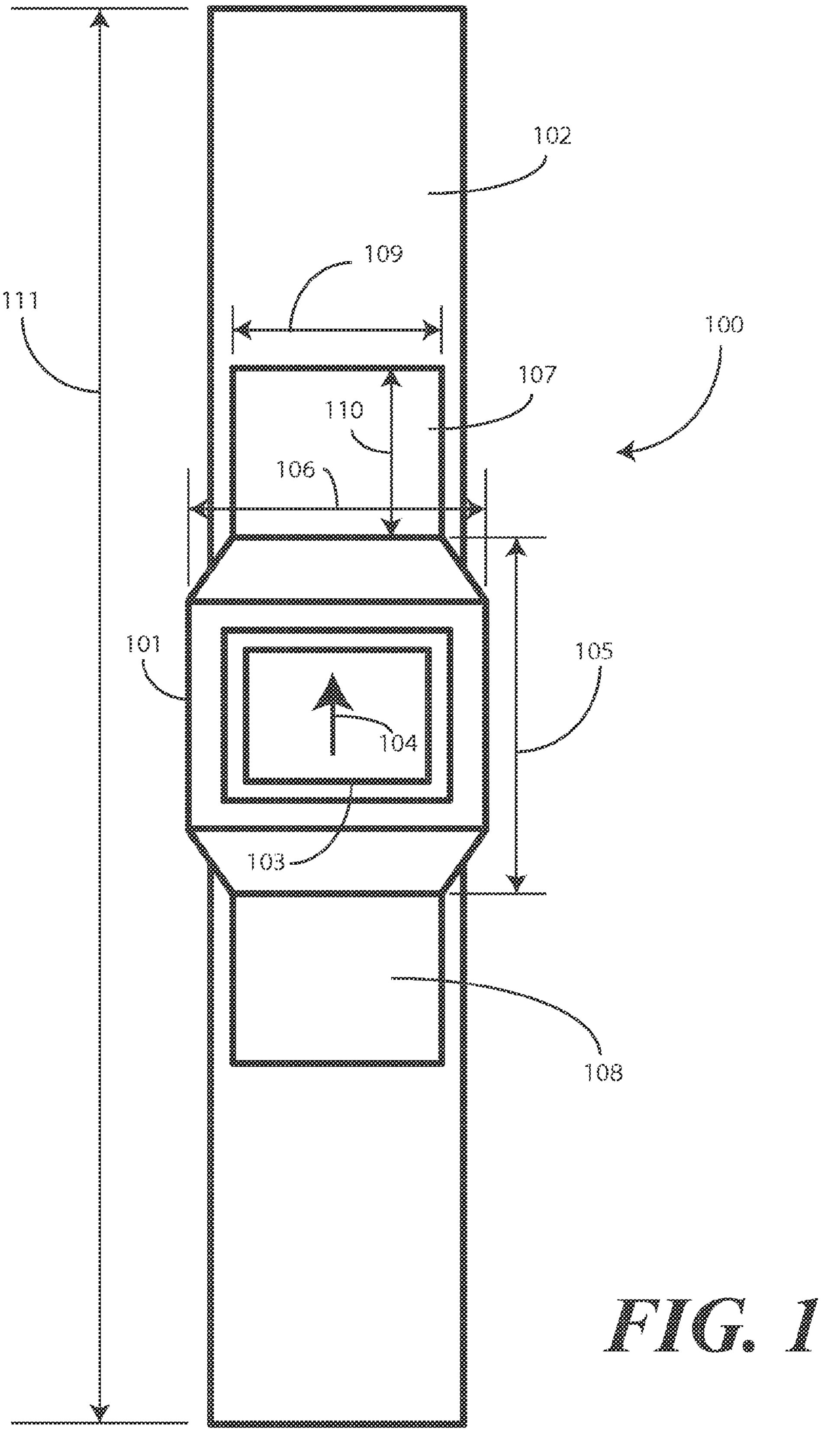
FIG. 1 illustrates one explanatory electronic device configured in accordance with one or more embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF EMBODIMENTS OF THE INVENTION

Before describing in detail embodiments that are in accordance with the present invention, it should be observed that the embodiments reside primarily in combinations of method steps and apparatus components related to clothing detection in a wearable electronic device, such as an electronic device that can be worn on a wrist and, accordingly, covered by a sleeve. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of clothing detection in a wearable electronic device as described herein. The non-processor circuits may include, but are not limited to, a radio receiver, a radio transmitter, signal drivers, clock circuits, power source circuits, and user input devices. As such, these functions may be interpreted as steps of a method to perform clothing detection by a wearable electronic device. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Also, reference designators shown herein in parenthesis indicate components shown in a figure other than the one in discussion. Relational terms such as first and second, top and bottom, and the like may be used solely to distinguish one entity or action from another entity or action without necessarily requiring or implying any actual such relationship or order between such entities or actions. For example, talking about a device (10) while discussing figure A would refer to an element, 10, shown in figure other than figure A.

Embodiments of the invention described below employ a combination of local sensors to determine whether clothing has covered a wearable electronic device. In one embodiment, a method for detecting clothing includes using a first sensor or sensors to detect whether a wearer is wearing the device. For example, a galvanic skin sensor can be used to determine that a wearer is wearing the device on their wrist. Alternatively, a tension sensor can be used in conjunction with a strap to determine whether the tension applied to the strap exceeds a predetermined threshold corresponding to a strap that has been secured about a wearer's limb.

A second sensor or sensors then determine whether the wearable electronic device is covered. For instance, an infrared sensor can be used to determine that the electronic device has been covered for an extended period of time. If a wearer straps the electronic device to a wrist, and then covers the device with a shirt or jacket sleeve, the second sensor or sensors can be configured to detect such coverage.

Once the second sensor or sensors detects that the device has been covered, in response to this detection, a third sensor or sensors can be used to prevent false positive coverage detection. For example, a third sensor can perform an additional determination of whether the wearable electronic device is covered with clothing. In one embodiment, an array of microphones disposed along the electronic device can be configured to detect a noise profile corresponding to a clothing object covering the electronic device. Where the device is covered by a jacket sleeve for instance, the microphones may detect an altered or muffled sound caused by the sleeve. Alternatively, the microphones may detect an altered acoustical spectrum during operation. If, for instance, an incoming call is received in a wearable communication device, and an on-board loudspeaker emits a sound, the microphones may detect that the clothing is altering the acoustic spectrum associated with this sound. This additional check provides a further confirmation that the object covering the electronic device is clothing, as opposed to a situation where the electronic device is merely placed in a box or drawer.

Where the confirmation check indicates that clothing is indeed covering the electronic device, a control circuit in the electronic device can be configured to adjust one or more device settings of the device. The adjustment can comprise changing an output notification of one or more loudspeakers of the wearable electronic device, such as changing the ring tone so that a user may better hear the device when alerts are emitted. Alternatively, the adjusting can comprise placing the device in a vibration mode so the user may feel the device when alerts are emitted. In another embodiment, where the user is near another wireless electronic device, such as a computer, television, media player, etc., the adjustment can comprise wirelessly delivering audio, video, or combinations thereof to the other electronic device. In so doing, the user can see, for example, video on the other device without the need for uncovering the wearable device. In another embodiment, the adjustment can comprise transmitting one or more notification messages. The device may answer incoming calls or messages, for example, with an automatic reply stating "The person you are calling has the device covered with clothing and may not hear the ring tone." In yet another embodiment, the adjustment may comprise adjusting one or more of a pitch, tone, spectral content, pattern, volume, timbre, or combinations thereof of alert tones emitted by the wearable electronic device. The volume of a ring tone can be increased, moved to a pitch that is more likely to penetrate clothing, and so forth, in response to being covered. In yet another embodiment, the adjustment can comprise placing the device into a power saving mode. This list is illustrative only and is not exhaustive, as other adjustments will be readily apparent to those of ordinary skill in the art having the benefit of this disclosure.

To illustrate with a simple use case, presume that the wearable electronic device is a communication device (e.g., a mobile phone) and personal digital assistant configured to resemble a wristwatch, and that is wearable on the wrist. A person with such a wearable device may place it on their wrist and then don a coat before heading outdoors. The sleeve of the coat may, presumably, cover the wearable device. Embodiments of the present invention detect this coverage and automatically adjust one or more operational settings for more appropriate functionality in the covered environment.

Skin and tension sensors can confirm that the user is wearing the device. Infrared sensors can be used to determine that something is covering the device. Microphone arrays can detect muffled sounds to confirm that clothing is covering the device. A control unit can then use these inputs to conclude that clothing is covering the device. Additional sensors can be used to supplement the determination that the device is covered. The control unit can consider ambient temperature, time of day, weather, season, location of the device, whether the device is indoors or outdoors, and so forth. The operational mode of the device can then be altered for better performance. Options for changing the operational mode include: not engaging the display until the device is uncovered; increasing output loudspeaker gain to ensure the user could hear alerts, calls, and so forth; selection of appropriate ring tones and alerts that could be better heard or through clothing; employing ring tones and alerts that are spectrally altered to better penetrate through clothing; notifying the user that clothing is obscuring the device via vibration, alert beeps, and so forth; selection of a microphone or loudspeaker on the device from an array of microphones or speakers for optimum (least obscured) performance; replying to incoming communication with automatic messages indicating non-availability of the user; forwarding communication to other devices, e.g., car systems, speakers, displays, and so forth.

As will be described below, the sensors used with embodiments of the present invention can vary. In addition to those mentioned above, other sensors can be used to detect clothing. For example, cameras and imaging devices can be used to detect objects covering the device. Pressure sensors for detecting either covering or that the device is being worn can include capacitive sensors, piezo electric sensors, resistive pressure sensors, mechanical strain sensors, skin conductivity sensors, and so forth.

Where microphones are used to detect muffled sounds corresponding to acoustic profiles associated with clothing covering the device, those acoustic profiles can be configured to correspond to various types of clothing, e.g., wool, cotton, leather, and so forth. These acoustic profiles can be set in a factory and stored in the device for a match comparison.

For explanatory purposes below, the electronic device used in the figures is a wearable device configured as a wristwatch. However, it will be clear to those of ordinary skill in the art having the benefit of this disclosure that the sensors, control circuits, and associated modules used to detect clothing covering the device and to alter the operational mode of the device could be integrated into any of a number of portable electronic devices, including mobile telephones, personal digital assistants, smart phones, palm-top computers, tablet devices, portable computers, and so forth. As these latter devices can be placed in pockets and sleeves, they too can benefit from clothing detection embodiments described below.

Turning now to FIG. 1, illustrated therein is one explanatory example of an electronic device 100 suitable for use with clothing detection systems described herein. For illustration purposes and simplicity of discussion, the electronic device 100 used in many of the figures is configured as a wearable electronic device. For example, the electronic device 100 of FIG. 1 is configured as a wristwatch having an active strap 102 and a detachable electronic module 101. This electronic device 100 is useful for discussion purposes because wearable devices configured in accordance with embodiments described herein can perform additional functions that traditional electronic devices cannot. However, it will be clear to those of ordinary skill in the art having the benefit of this disclosure that the additional features are optional and can be used in some applications, while the clothing detection techniques can be applied to simpler, non-wearable devices without employing all of the advanced features of the illustrative wearable device.

Figure 2:
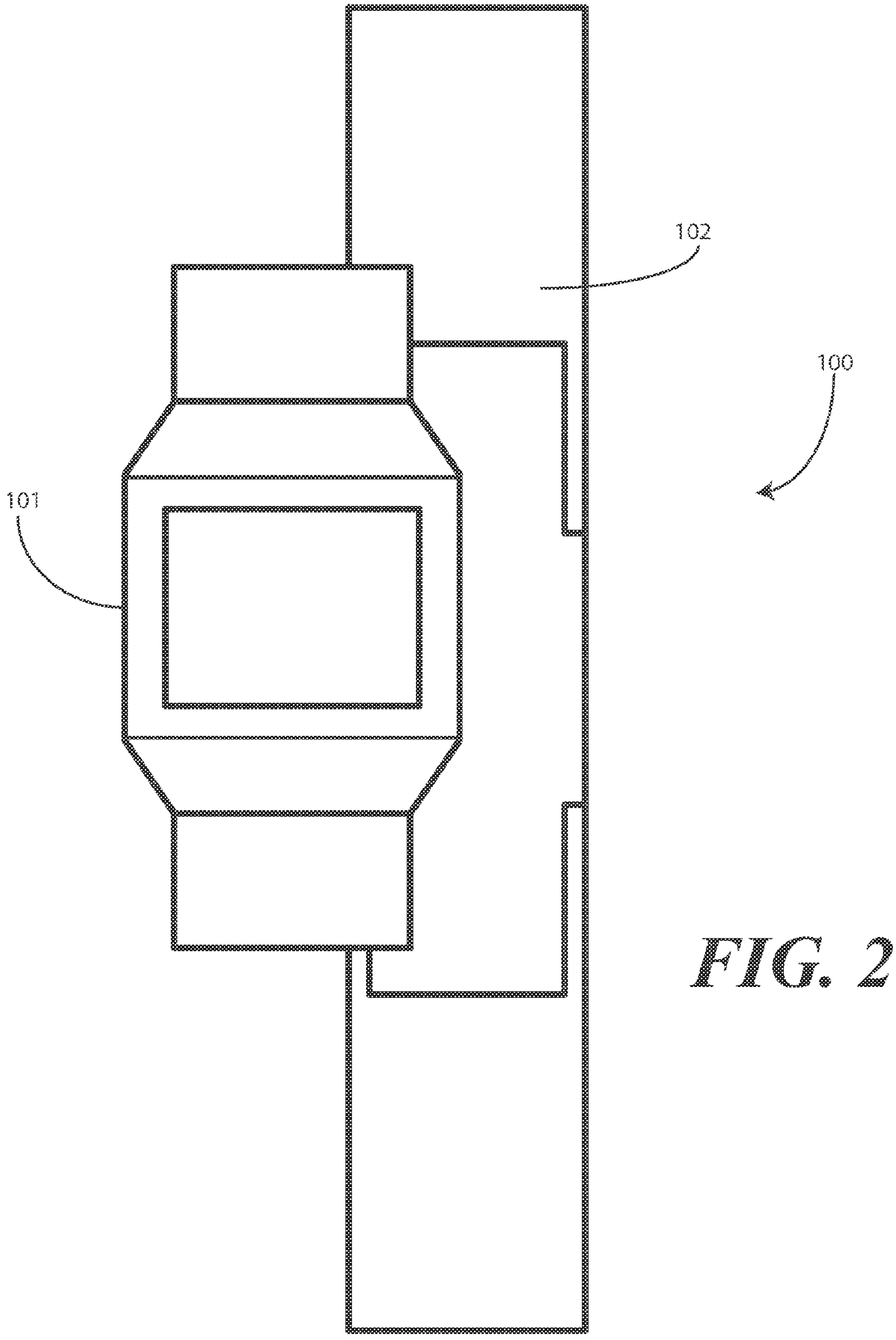
FIG. 2 illustrates an exploded view of one explanatory electronic device with separable components configured in accordance with one or more embodiments of the invention.

As shown in FIG. 2, in one embodiment the detachable electronic module 101 can be configured so as to be selectively detachable from the active strap 102. Accordingly, the detachable electronic module 101 so as to be used as a stand alone electronic device. For example, the detachable electronic module 101 can be configured with cellular communication capabilities and may be detached from the active strap 102 to be used more privately as a mobile telephone than if it were coupled to a wearer's wrist. In other embodiments, the active strap 102 can optionally be configured with mechanically configurable characteristics such that it can be used as a configurable stand when the electronic device 100 is placed on a table. Both the active strap 102 and the detachable electronic module 101 can be configured as "active" devices. An active device refers to a device that includes a power source and hardware. Active devices can include control circuits or processors as well.

In one or more embodiments, the detachable electronic module 101 can be detached from the active strap 102 so that it can be coupled with, or can communicate or interface with, other devices. For example, where the detachable electronic module 101 includes wide area network communication capabilities, such as cellular communication capabilities, the detachable electronic module 101 may be coupled to a folio or docking device to interface with a tablet-style computer. In this configuration, the detachable electronic module 101 can be configured to function as a modem or communication device for the tablet-style computer. In such an application, a user may leverage the large screen of the tablet-style computer with the computing functionality of the detachable electronic module 101, thereby creating device-to-device experiences for telephony, messaging, or other applications. The detachable nature of the detachable electronic module 101 serves to expand the number of experience horizons for the user.

Turning back to FIG. 1, in one embodiment the detachable electronic module 101 includes a display 103 configured to provide visual output having a presentation orientation 104 associated therewith. The visual output can be text, pictures, video, audio, or other content. As will be shown in subsequent figures, in one or more embodiments, the electronic device 100 can be configured with various combinations of the following features: wide area network communication capabilities, e.g., cellular or other mobile communication capabilities; local area network communication capabilities, e.g., Bluetooth™ or other similar communication capabilities; voice call capabilities including conventional phone functionality, speaker phone functionality, or private mode capabilities via a wired or wireless headset; one or more wellness sensors, such as heart rate sensors, temperature sensors, or sweat sensors; context sensors, such as accelerometers, global positioning sensors, microphones, local infrared sensors, local light sensors, and local touch sensors; and other safety and security sensors and applications. These features can be integrated into the detachable electronic module 101, the active strap 102, or by way of a combination of the two when coupling the detachable electronic module 101 to the active strap 102 is both an electrical and mechanical coupling.

The detachable electronic module 101, in one embodiment, is equipped with a first detachable electronic module extension 107 and a second detachable electronic module extension 108. The detachable electronic module extensions 107,108 can be coupled to the housing of the detachable electronic module 101 by way of hinge. Accordingly, the first electronic module extension 107 can be hingedly coupled to a first side of the housing such that it extends distally from the first side of the housing, while the second electronic module extension 108 can be hingedly coupled to a second side of the housing that different from the first side, such that it extends distally from the second side of the housing. The hinged attachment allows the first electronic module extension 107 and the second electronic module extension 108 to selectively pivot from a closed position, where the electronic module extensions 107,108 are disposed against a rear, major face of the housing, to an angularly displaced open position extending distally outward from the housing.

The illustrative electronic device 100 of FIGS. 1 and 2 includes a form factor that is thin, pleasing, functional, and practical. Exemplary dimensions of some of the components will aid in understanding the shape and size of one explanatory embodiment. For instance, the display 103 can be configured with a 1.6 inch diagonal dimension. The detachable electronic module 101 can have a length 105 of about 62 millimeters, and a width of about 49 millimeters. (The term "about" is used to refer to dimensions inclusive of manufacturing and component tolerances. For example, a measurement of 48.1 or 49.9 millimeters will be about 49 millimeters when the manufacturing tolerances are plus or minus 1 millimeter.) In this illustrative embodiment, the detachable electronic module extensions 107,108 have a width 109 of about 42 millimeters, and a length 110 of between 20 and 40 millimeters, depending upon the application. An illustrative detachable electronic module 101 with communication capabilities, wellness detectors, and audio capabilities can be formed with a thickness (into the page) of about 10 millimeters. The length 111 of the active strap 102 can vary based upon target wearer's wrist size or application.

Figure 3:
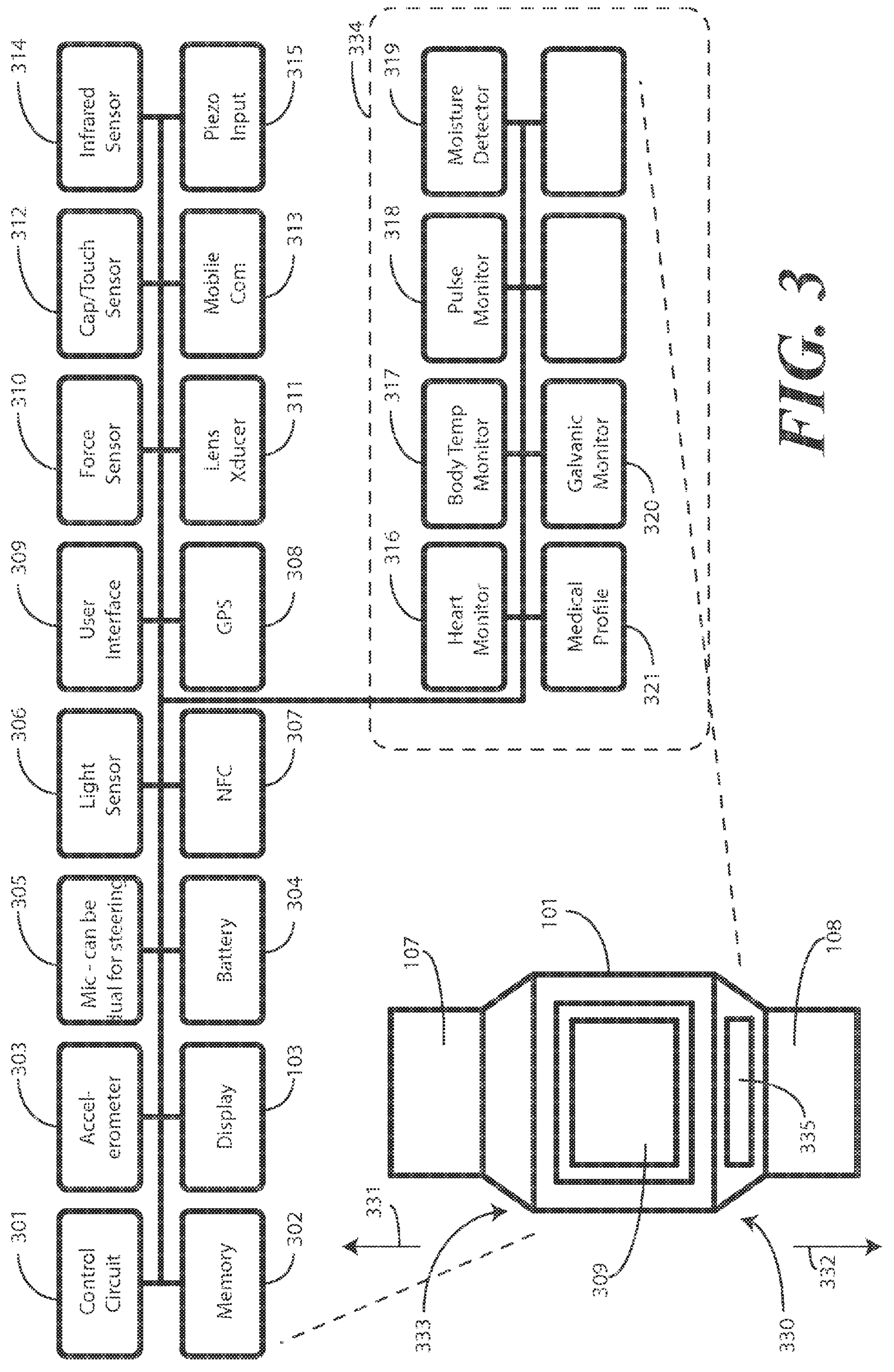
FIG. 3 illustrates a schematic block diagram of one explanatory electronic device configured in accordance with one or more embodiments of the invention.

Turning now to FIG. 3, illustrated therein is a schematic block diagram of various components and modules suitable for inclusion in the detachable electronic module 101. It will be clear to those of ordinary skill in the art having the benefit of this disclosure that the components and modules can be used in different combinations, with some components and modules included and others omitted. Components or modules can be included or excluded based upon need or application.

A control circuit 301 is coupled to the display 103. The control circuit 301 can be operable with a memory 302. The control circuit 301, which may be any of one or more microprocessors, programmable logic, application specific integrated circuit device, or other similar device, is capable of executing program instructions and methods described herein. The program instructions and methods may be stored either on-board in the control circuit 301, or in the memory 302, or in other computer readable media coupled to the control circuit 301. The control circuit 301 can be configured to operate the various functions of the detachable electronic module 101, and also to execute software or firmware applications and modules that can be stored in a computer readable medium, such as memory 302. The control circuit 301 executes this software or firmware, in part, to provide device functionality.

The memory 302 may include either or both static and dynamic memory components, may be used for storing both embedded code and user data. One suitable example for control circuit 301 is the MSM7630 processor manufactured by Qualcomm, Inc. The control circuit 301 may operate one or more operating systems, such as the Android™ mobile operating system offered by Google, Inc. In one embodiment, the memory 302 comprises an 8-gigabyte embedded multi-media card (eMMC).

The control circuit 301, which in one embodiment is disposed in the central housing of the detachable electronic module 101 and not within either the first detachable electronic module extension 107 or the second detachable electronic module extension 108, can be configured to alter an operating mode of the electronic module to one of a plurality of functional modes. Functional modes of the detachable electronic module 101 can include a desktop mode, a telephone mode, a wristwatch mode, a health monitoring mode, a clock mode, a calendar mode, a gaming mode, or a media player mode. The control circuit 301 can be configured to select an appropriate mode based upon whether the detachable electronic module 101 is covered by clothing. Alternatively, in other embodiments, the control circuit 301 can select an operational mode from these functional modes by detecting an angularly displaced orientation of the first detachable electronic module extension 107, the second detachable electronic module extension 108, or combinations thereof.

The display 103 is configured to provide visual output, images, or other visible indicia to a user. In one embodiment, the display 103 comprises a 1.6 inch organic light emitting diode (OLED) device. In one embodiment, the display 103 comprises a touch sensor 312 to form touch sensitive display configured to receive user input across the surface of the display 103. The display 103 can also be configured with a force sensor 310. Where configured with both a touch sensor 312 and force sensor 310, the control circuit 301 can determine not only where the user contacts the display 103, but also how much force the user employs in contacting the display 103. Where configured with a force sensor 310 but no touch sensitive capabilities, the display 103 can be used as a large "push button" or input control for the detachable electronic module 101. In one embodiment, explained in more detail below with reference to FIG. 15, the outer lens of the display 103 can be configured with piezoelectric sensors 315 or other actuators to be used as both an input device and an acoustic transducer.

The touch sensor 312 can include a capacitive touch sensor, an infrared touch sensor, or another touch-sensitive technology. Capacitive touch-sensitive devices include a plurality of capacitive sensors, e.g., electrodes, which are disposed along a substrate. Each capacitive sensor is configured, in conjunction with associated control circuitry, e.g., control circuit 301 or another display specific control circuit, to detect an object in close proximity with—or touching—the surface of the display 103 or the housing of the detachable electronic module 101 by establishing electric field lines between pairs of capacitive sensors and then detecting perturbations of those field lines.

The electric field lines can be established in accordance with a periodic waveform, such as a square wave, sine wave, triangle wave, or other periodic waveform that is emitted by one sensor and detected by another. The capacitive sensors can be formed, for example, by disposing indium tin oxide patterned as electrodes on the substrate. Indium tin oxide is useful for such systems because it is transparent and conductive. Further, it is capable of being deposited in thin layers by way of a printing process. The capacitive sensors may also be deposited on the substrate by electron beam evaporation, physical vapor deposition, or other various sputter deposition techniques. For example, commonly assigned U.S. patent application Ser. No. 11/679,228, entitled "Adaptable User Interface and Mechanism for a Portable Electronic Device," filed Feb. 27, 2007, which is incorporated herein by reference, describes a touch sensitive display employing a capacitive sensor.

The force sensor 310 can take various forms. For example, in one embodiment, the force sensor 310 comprises resistive switches or a force switch array configured to detect contact with either the display 103 or the housing of the detachable electronic module 101. An "array" as used herein refers to a set of at least one switch. The array of resistive switches can function as a force-sensing layer, in that when contact is made with either the surface of the display 103 or the housing of the detachable electronic module 101, changes in impedance of any of the switches may be detected. The array of switches may be any of resistance sensing switches, membrane switches, force-sensing switches such as piezoelectric switches, or other equivalent types of technology. In another embodiment, the force sensor 310 can be capacitive. One example of a capacitive force sensor is described in commonly assigned, U.S. patent application Ser. No. 12/181,923, filed Jul. 29, 2008, published as US Published Patent Application No. US-2010-0024573-A1, which is incorporated herein by reference. In yet another embodiment, piezoelectric sensors 315 can be configured to sense force as well. For example, where coupled with the lens of the display 103, the piezoelectric sensors 315 can be configured to detect an amount of displacement of the lens to determine force. The piezoelectric sensors 315 can also be configured to determine force of contact against the housing of the detachable electronic module 101 rather than the display 103.

A mobile communication circuit 303 can be included to provide wide area communication capabilities. Where included, the mobile communication circuit 303 is operable with the control circuit 301, and is used to facilitate electronic communication with various networks, such as cellular networks, data networks, or the Internet. Note that it is possible to combine the control circuit 301, the memory 302, and the mobile communication circuit 303 into a single device or into devices having fewer parts while retaining the functionality of the constituent parts.

The mobile communication circuit 303, which may be one of a receiver or transmitter, and may alternatively be a transceiver, operates in conjunction with the control circuit 301 to electronically communicate through a communication network. For example, in one embodiment, the mobile communication circuit 303 can configured to communicate through a traditional cellular network, such as a Code Division Multiple Access (CDMA) network or Global System for Mobile communication (GSM) network. Other examples of networks with which the communication circuit may communicate include Push-to-Talk (PTT) networks, proprietary networks, dual band CDMA networks, or Dual Band Universal Mobile Telecommunications System (UMTS) networks, and direct communication networks.

The mobile communication circuit 303 can be configured to provide messaging functionality to the detachable electronic module 101. In one or more embodiments, the detachable electronic module can communicate with one or more social networking applications through the mobile communication circuit 303 as well. News feeds and other data can be received through the mobile communication circuit 303. Moreover, context and location sensitive notifications can be sent and received via the mobile communication circuit 303.

A battery 304 or other energy source can be included to provide power for the various components of the detachable electronic module 101. While a battery 304 is shown in FIG. 3, it will be obvious to those of ordinary skill in the art having the benefit of this disclosure that other energy storage deices can be used instead of the battery 304, including a fuel container or an electrochemical capacitor. The battery 304 can include a lithium ion cell or a nickel metal hydride cell, such cells having reasonably large energy capacity, wide operating temperature range, large number of charging cycles, and long useful life. The battery 304 may also include overvoltage and overcurrent protection and charging circuitry. In one embodiment, the detachable electronic module 101 includes two batteries, with a battery being stored in each of the detachable electronic module extensions 107,108. In one embodiment, the battery 304 is configured as an 800 mAh lithium polymer cell.

In one or more embodiments, the battery 304 disposed within the first electronic module extension 107, the second electronic module extension 108, or combinations thereof, and not within the central housing of the detachable electronic module 101. In such a configuration, the battery 304 is configured to deliver energy to electronic components, e.g., the control circuit 301, memory 302, display 103, etc., each of which is disposed only within the central housing of the detachable electronic module 101.

One or more microphones 305 can be included to receive voice input, voice commands, and other audio input. A single microphone can be included. Optionally, two or more microphones can be included for selective beam steering. For example a first microphone can be located on a first side 330 of the detachable electronic module 101 for receiving audio input from a first direction 332. Similarly, a second microphone can be placed on a second side 331 of the detachable electronic module 101 for receiving audio input from a second direction 333. As will be described below, an infrared sensor 314, light sensor 306, or other sensor can detect a direction in which a user is located. The control circuit 301 can then select between the first microphone and the second microphone to beam steer audio reception toward the user. Alternatively, the control circuit 301 processes and combines the signals from two or more microphones to perform beam steering. The one or more microphones 305 can be used for voice commands. When altering the presentation orientation of information presented on the display, the one or more microphones 305 can be configured to be responsive to the control circuit 301. Accordingly, the control circuit 301 can switch between microphones upon altering the presentation orientation in response to the user input.

A light sensor 306 is configured to detect changes in optical intensity, color, light, or shadow in the near vicinity of the detachable electronic module 101. For example, the light sensor 306 can be configured as an image sensing device that captures successive images about the device and compares luminous intensity, color, or other spatial variations between images to detect motion or the presence of an object near the detachable electronic module 101. Such sensors can be useful in determining whether the detachable electronic module 101 is covered by clothing. Additionally, these sensors can determine at which side of the detachable electronic module 101 a user is standing. An infrared sensor 314 can be used in conjunction with, or in place of, the light sensor 306. The infrared sensor 314 can be configured to operate in a similar manner, but on the basis of infrared radiation rather than visible light. The light sensor 306 and/or infrared sensor 314 can be used for gesture commands, as will be described with reference to subsequent figures.

A near field communication circuit 307 can be included for communication with local area networks. Examples of suitable near field communication circuits include Bluetooth communication circuits, IEEE 801.11 communication circuits, infrared communication circuits, magnetic field modulation circuits, and Wi-Fi circuits.

A global positioning system device 308 can be included for determining where the detachable electronic module 101 is located. (Note that the global positioning system device 308 can also be used to determine the spatial orientation of the detachable electronic module 101 in three-dimensional space by determining the change in position of the device relative to the earth.) The global positioning system device 308 is configured for communicating with a constellation of earth orbiting satellites or a network of terrestrial base stations to determine an approximate location. Examples of satellite positioning systems suitable for use with embodiments of the present invention include, among others, the Navigation System with Time and Range (NAVSTAR) Global Positioning Systems (GPS) in the United States of America, the Global Orbiting Navigation System (GLONASS) in Russia, and other similar satellite positioning systems. The satellite positioning systems based location fixes of the global positioning system device 308 autonomously or with assistance from terrestrial base stations, for example with assistance from a cellular communication network or other ground based network, or as part of a Differential Global Positioning System (DGPS), as is well known by those having ordinary skill in the art. While a global positioning system device 308 is one example of a location determination module, it will be clear to those of ordinary skill in the art having the benefit of this disclosure that other location determination devices, such as electronic compasses or gyroscopes, could be used as well.

A user interface 309 can be included. As noted above, in one embodiment, the display 103 is configured as a touch sensitive display, and accordingly functions as a user interface in and of itself. However, some applications will be better served with additional user interface components as well. The user interface 309, where included, can be operable with the control circuit 301 to deliver information to, and receive information from, a user. The user interface 309 can include a keypad 335, navigation devices, joysticks, rocker switches, slider pads, buttons, or other controls, and optionally a voice or touch command interface. These various components can be integrated together.

In one or more embodiments, the lens of the display 103 can be configured as a lens transducer 311 to deliver audio output to a user. While this will be described in more detail with reference to FIG. 15 below, piezoelectric transducers can be operably disposed with a lens of the display 103. Actuation of the piezoelectric transducers can cause the lens of the display 103 to vibrate, thereby emitting acoustic output. An example of a piezo-driven lens speaker is described in commonly assigned, pending U.S. Ser. No. 12/967,208, filed Dec. 14, 2010, entitled "A PORTABLE ELECTRONIC DEVICE," which is incorporated herein by reference.

An accelerometer 313 can be included to detect motion of the detachable electronic module 101. The accelerometer 313 can also be used to determine the spatial orientation of the detachable electronic module 101 in three-dimensional space by detecting a gravitational direction. In addition to, or instead of, the accelerometer 313, an electronic compass can be included to detect the spatial orientation of the detachable electronic module 101 relative to the earth's magnetic field. Similarly, one or more gyroscopes can be included to detect rotational motion of the detachable electronic module 101. The gyroscope can be used to determine the spatial rotation of the detachable electronic module 101 in three-dimensional space.

Where the detachable electronic module 101 is configured as a wellness device, or is capable of operating in a health monitoring mode, one or more wellness sensors 334 can be included as well. Examples of wellness sensors are described in commonly assigned U.S. patent application Ser. No. 10/396,621, filed Mar. 24, 2003, published as US Published Patent Application No. 2004/0015058, which is incorporated herein by reference.

For example, a heart monitor 316 can be configured to employ EKG or other sensors to monitor a user's heart rate. The heart monitor 316 can include electrodes configured to determine action potentials from the skin of a user. A temperature monitor 317 can be configured to monitor the temperature of a user. A pulse monitor 318 can be configured to monitor the user's pulse. The pulse monitor 318 lends itself to the wristwatch configuration of the electronic device (100) of FIG. 1 because the wrist serves as an advantageous location from which to measure a person's pulse. These devices can be used to determine when the detachable electronic module 101 is coupled to a user's wrist.

A moisture detector 319 can be configured to detect the amount of moisture present on a person's skin. The moisture detector 319 can be realized in the form of an impedance sensor that measures impedance between electrodes. As moisture can be due to external conditions, e.g., rain, or user conditions, perspiration, the moisture detector 319 can function in tandem with ISFETS configured to measure pH or amounts of NaOH in the moisture or a galvanic sensor 320 to determine not only the amount of moisture, but whether the moisture is due to external factors, perspiration, or combinations thereof. This device can be used to determine whether the detachable electronic module 101 or active strap 102 is being worn by the user.

The medical history of a user, as well as the determinations made by the various wellness sensors 334, can be stored in a medical profile 321. Periodic updates can be made to the medical profile 321 as well. The medical profile 321 can be a module operable with the control circuit 301. Such modules can be configured as sets of instructions stored in the memory 302 that are usable by the control circuit 301 to execute the various wellness monitoring functions of the detachable electronic module 101. Alternatively, the modules could be configured in hardware, such as through programmable logic. The wellness sensors 334 shown in FIG. 3 are illustrative only. Embodiments of the present invention may use various combinations of wellness sensors 334, including subsets of the wellness sensors 334 shown in FIG. 3. Further, other modules may be added to further increase device functionality. The wellness sensors 334 can be used to provide the user with a sensor-based health and wellness data assessment. The wellness sensors 334 can be used in conjunction with the medical profile 321 to provide context sensitive recommendations on the display 103.

Figure 4:
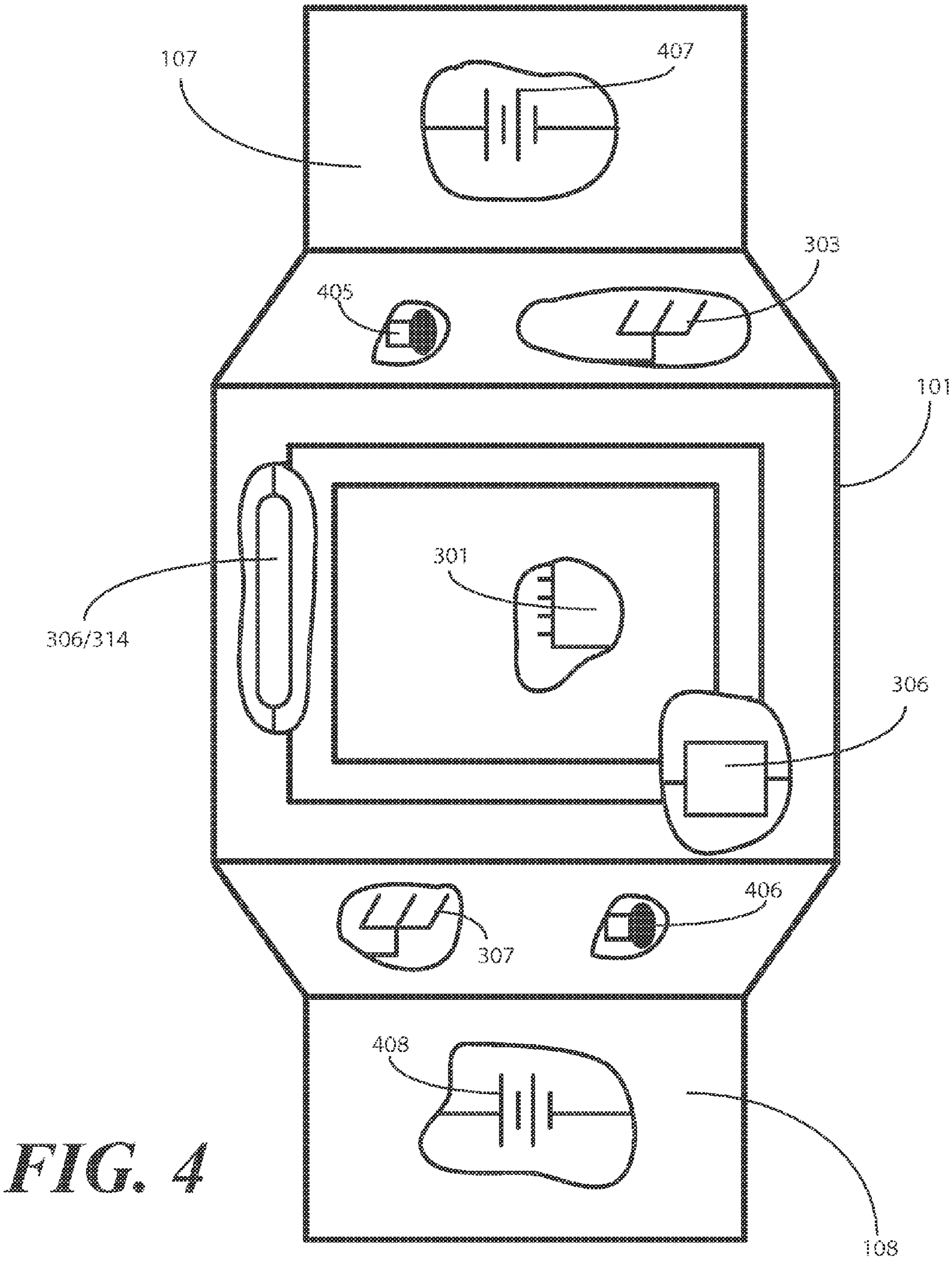
FIG. 4 illustrates a cut-away view of one explanatory electronic device configured in accordance with one or more embodiments of the invention.

Turning now to FIG. 4, illustrated therein is a cut-away view of the detachable electronic module 101 illustrating how some of the components of FIG. 3 may be disposed within the housing of the detachable electronic module 101. The battery (304) in the embodiment of FIG. 4 comprises a first cell 407 disposed in a first detachable electronic module extension 107 and a second cell 408 disposed in a second detachable electronic module extension 108. All other electrical components, such as the control circuit 301, are disposed within a central housing of the detachable electronic module 101, with the exception of any conductors or connectors required to deliver energy from the first cell 407 and second cell 408 to the electronic components disposed within the central housing. In this illustrative embodiment, the first cell 407 and second cell 408 each comprise 400 mAh lithium cells. Where the detachable electronic module 101 is configured for communication with both wide area networks, e.g., cellular networks, and local area networks, e.g., WiFi networks, both the first cell 407 and the second cell 408 can be included. However, in some embodiments where only local area network communication or no communication capability is included, one of the first cell 407 or second cell 408 may be omitted.

The mobile communication circuit 303 is disposed at a first end of the detachable electronic module 101. The near field communication circuit 307 can be disposed on a side of the detachable electronic module 101 opposite the mobile communication circuit 303. The global positioning system device (308), where included, can also be disposed on a side opposite the mobile communication circuit 303. In this illustrative embodiment, the global positioning system device (308) is displaced from the near field communication circuit 307 to avoid interference. The light sensor 306 and/or infrared sensor 314 can be disposed on a side of the device.

The microphones (305) in this illustrative embodiment comprise a first microphone 405 disposed on a first side of the detachable electronic module 101 and a second microphone 406 disposed on a second side of the detachable electronic module 101 that is opposite the first side. As noted above, multiple microphones can be included to receive voice input, voice commands, and other audio input. The microphones (305) can also be used to detect muffled sounds when clothing is covering the device. Said differently, the microphones can be used to detect a noise profile corresponding to a clothing object covering the wearable electronic device (100).

In this explanatory embodiment, the first microphone 405 and second microphone 406 can be used for selective beam steering. The infrared sensor 314, light sensor 306, or other sensor can detect a directional position of a user. The control circuit 301 can then select between the first microphone 405 and the second microphone 406 to beam steer audio reception toward the user.

Figure 5:
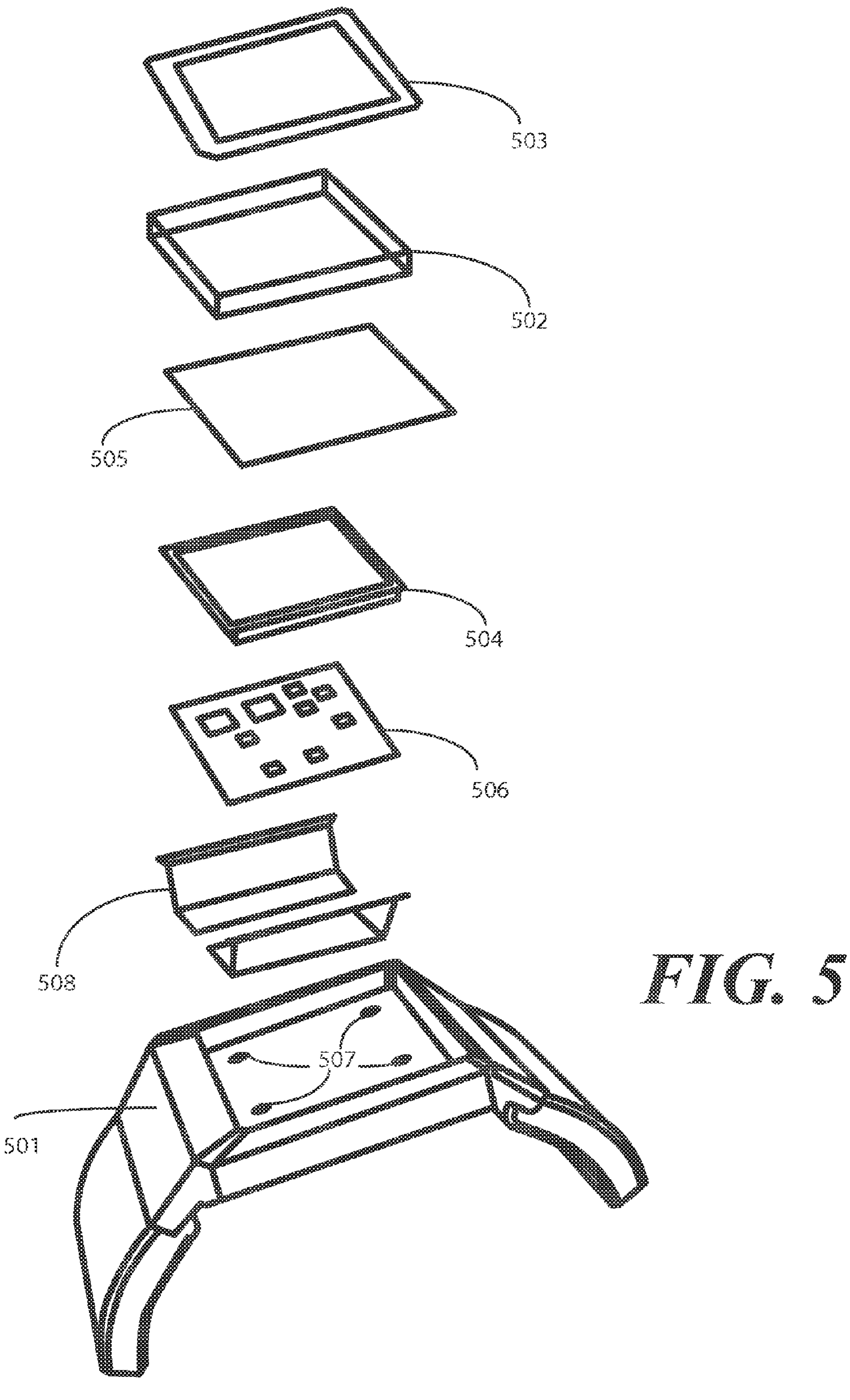
FIG. 5 illustrates an exploded view of some internal components associated with one explanatory electronic device configured in accordance with one or more embodiments of the invention.
Figure 6:
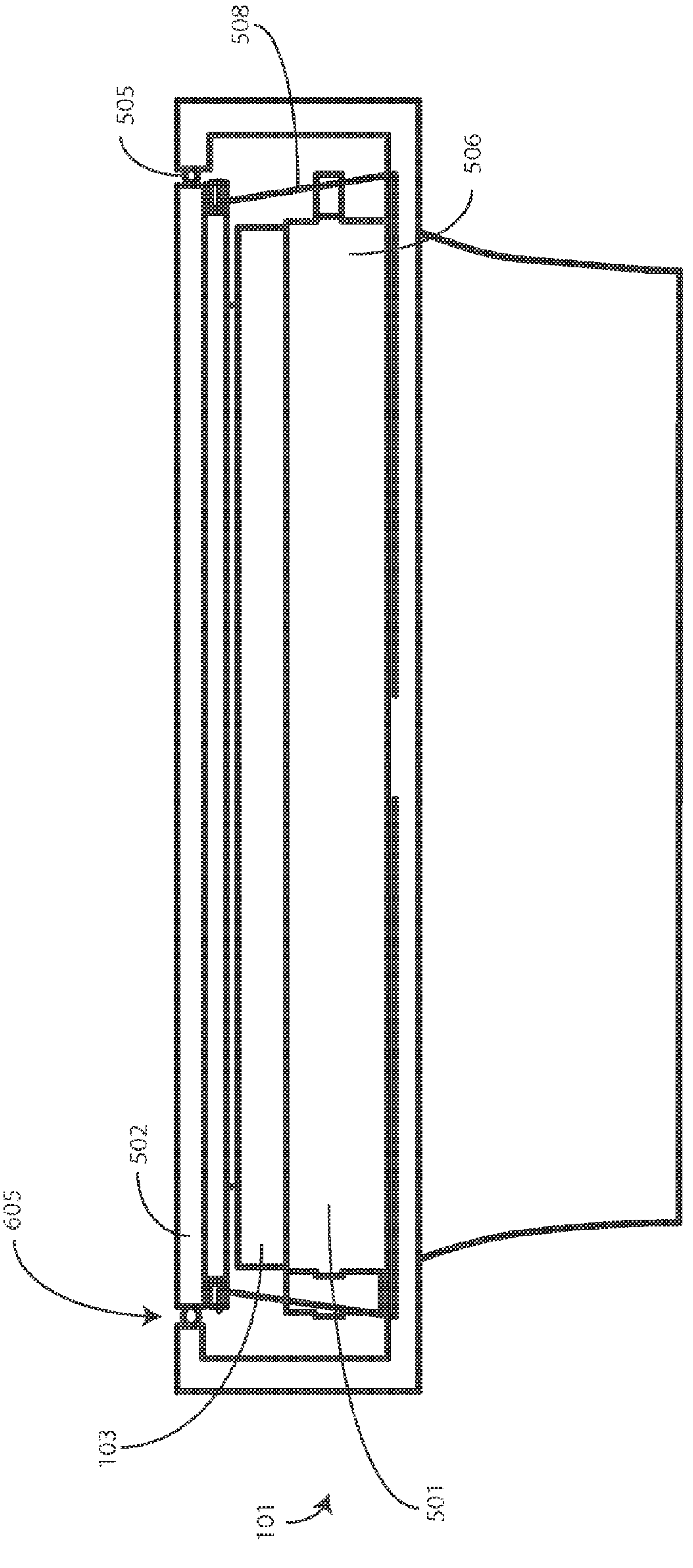
FIG. 6 illustrates a sectional view of one explanatory electronic device configured in accordance with one or more embodiments of the invention.

Turning now to FIGS. 5 and 6, illustrated therein are additional internal components associated with one explanatory detachable electronic module 101 configured in accordance with one or more embodiments of the invention. FIG. 5 illustrates an exploded view, while FIG. 6 illustrates a sectional view.

The detachable electronic module 101 includes a housing 501 configured to carry internal components. This illustrative housing 501 is curved and contoured so as to form a wearable housing, in that it can be coupled to either a passive or active strap and worn about a wrist, arm, or leg. Alternatively, it could be coupled about a waist as well. In one embodiment, the housing 501 and a cover layer 502 of the display assembly bound the internal components. An optional mechanical upper housing 503 can also be used to retain the cover layer 502 within the housing 501. (The optional mechanical upper housing 503 is not shown in FIG. 6.)

The cover layer 502 can be a substrate manufactured from thin plastic film, sheet plastic, or reinforced glass. The cover layer 502 serves as a fascia member for the detachable electronic module 101. A "fascia" is a covering or housing, which may or may not be detachable, for an electronic device like the detachable electronic module 101 of FIGS. 5 and 6. To provide ornamentation, text, graphics, and other visual indicators, the cover layer 502, in one embodiment, includes printing disposed on the rear face. Selective printing on the cover layer 502 may be desirable, for instance, around the perimeter of the cover layer 502 to cover electrical traces connecting internal components. Printing may be desired on the front face of the cover layer 502 for various reasons as well. For example, a subtle textural printing or overlay printing may be desirable to provide a translucent matte finish atop the detachable electronic module 101. Such a finish is useful to prevent cosmetic blemishing from sharp objects or fingerprints. By printing only on the rear face, the front face can remain smooth and glossy. The cover layer 502 may also include an ultra-violet barrier as well. Such a barrier is useful both in improving the visibility of the display module 504 and in protecting internal components of the detachable electronic module 101. As noted above, the cover layer 502 can include a plurality of indium tin oxide or other electrodes, which function as a capacitive sensor, to covert the display to a touch-sensitive display.

Beneath the cover layer 502 is the display module 504, which in this case is an OLED display module. The display module 504 is configured to provide visual output having a presentation orientation through the cover layer 502 to the user.

As noted above, in one or more embodiments, the display (103) or cover layer 502 can be can be used as a user input and as a transducer for acoustic output. In some embodiments, the cover layer 502, display module 504, or combinations thereof will be moveable relative to the housing 501. In some embodiments, an acoustic roll of compliant material 505 can be disposed between the cover layer 502 and the housing 501. The inclusion of the acoustic roll facilitates small movement of the cover layer 502, display module 504, or combinations thereof relative to the housing 501. A design gap 605 can be included between the cover layer 502 and the housing 501 for insertion of the acoustic roll of compliant material 505 and to facilitate travel of the cover layer 502 relative to the housing 501. In embodiments that have an exposed display (103) or display module with no cover layer 502, the display (103) or display module can be attached to the acoustic roll of compliant material 505 in place of the cover layer 502. In these embodiments, the movable display module would serve the as the user input and transducer for acoustic output.

A circuit carrier 506 can then include the control circuit (301) and other electronic circuitry components and modules. In one embodiment, the circuit carrier 506 comprises a printed circuit board manufactured from FR-4 fiberglass. In another embodiment, the circuit carrier 506 comprises a flexible substrate disposed about flexible conductors, which is known in the art as a "flex" circuit. The circuit carrier 506 can include components disposed on the top and bottom sides. Alternatively, the circuit carrier 506 can have components disposed on a single side to conserve cost. The circuit carrier 506 can comprise one or more substrates that are coupled together with electrical conductors, wires, or other flex circuits.

Where the cover layer 502 is used in conjunction with piezoelectric devices 507, a piezo frame 508 can be used as a mechanical support extending from the piezoelectric devices 507 and the cover layer 502. When the piezoelectric devices 507 are actuated, the piezo frame 508 transfers force to the cover layer 502 to make it move in response to the forces generated by the piezoelectric devices 507. Alternatively, when a user engages the cover layer 502 to use it as a control input, user exerted force is transferred through the piezo frame 508 to the piezoelectric devices 507, which function as an input sensor in this mode.

The piezoelectric devices 507 can be configured as disks or pills as shown in FIG. 5. Alternatively, the piezoelectric devices 507 can be configured as bendable elements bonded to the piezo frame 508. In the case where piezoelectric disks are couple to the piezo frame 508, one portion of the piezoelectric disks can be coupled to the piezo frame 508 while another portion of the piezoelectric disks is coupled to the housing 501 or another portion of detachable electronic module 101 that is more massive than the cover layer 502. Alternatively the piezoelectric disks can be disposed between the cover layer 502 and the piezo frame 508, reversing the order of the components, but still providing the same effective functionality. This latter embodiment serves as an effective mechanical grounding for the piezoelectric system. In an embodiment where the piezoelectric devices 507 are bendable elements bonded to the piezo frame 508, the bendable elements can be bonded only to the piezo frame 508, with the frame being coupled to both the cover layer 502 and the housing 501.

Figure 7:
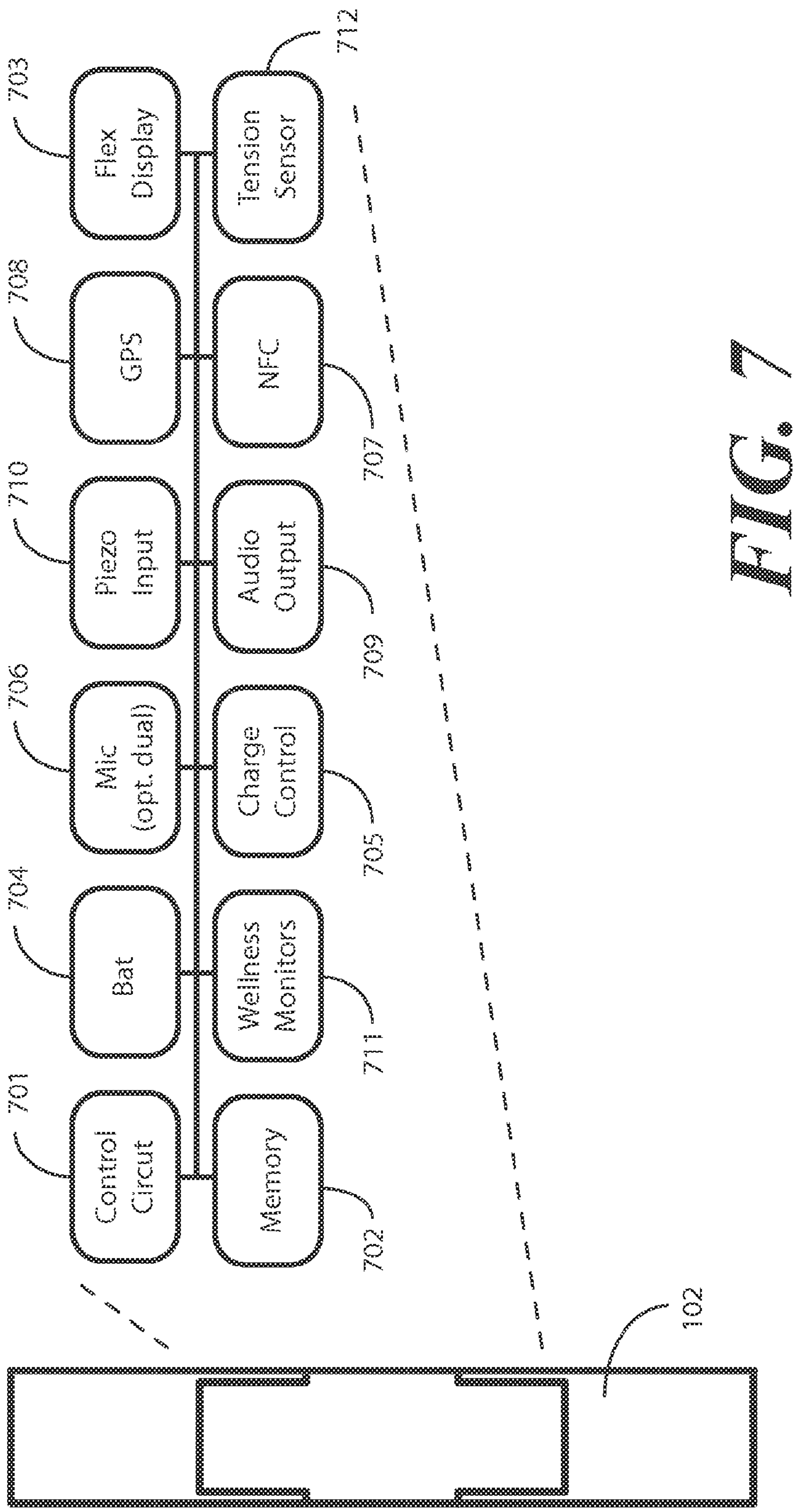
FIG. 7 illustrates a schematic block diagram of one explanatory wearable component suitable for use with an electronic device configured in accordance with one or more embodiments of the invention.

Turning to FIG. 7 illustrated therein are components that can be included in the active strap 102. Note that in many embodiments, the detachable electronic module (101) can be coupled to passive straps or attachments to form a wearable electronic device. In one or more embodiments, functionality can be increased by providing an active strap 102 that also includes a power source and hardware components. The components shown in FIG. 7 provide an illustration of components that can be included with the active strap 102. However, as with the modules shown in FIG. 3, the active strap 102 can include subsets of the modules, with only those modules being included as required by a particular application.

The active strap 102 can include its own control circuit 701. The control circuit 701 can be operable with a memory 702. The control circuit 701, which may be any of one or more microprocessors, programmable logic, application specific integrated circuit device, or other similar device, is capable of executing program instructions associated with the functions of the active strap 102. The program instructions and methods may be stored either on-board in the control circuit 701, or in the memory 702, or in other computer readable media coupled to the control circuit 701.

The active strap 102 can include a display 703. In one embodiment, the display 703 comprises one or more flexible display devices. Since the active strap 102 can be configured as a wristband for a wristwatch-type wearable device, flexible displays disposed on the active strap 102 can "wrap" around the wearer's wrist without compromising operational performance. While the display 703 can include non-flexible displays as well, the inclusion of flexible display devices not only increases comfort for the wearer but also allows the display 703 to be larger as well. The display 703 can be configured to be touch sensitive also, thereby allowing the display 703 to be used as a control input. The display is configured to provide visual output, images, or other visible indicia to a user. The display 703 can also be configured with a force sensor. Where configured with both, the control circuit 701 can determine not only where the user contacts the display 703, but also how much force the user employs in contacting the display 703. Where configured with a force sensor only, the display 703 can be used as a large "push button" or input control.

A battery 704 or other energy source can be included to provide power for the various components of the active strap 102. In one or more embodiments, the battery 704 is selectively detachable from the active strap 102. Charging circuitry 705 can be included in the active strap 102 as well. The charging circuitry 705 can include overvoltage and overcurrent protection. In one embodiment, the battery 704 is configured as a flexible lithium polymer cell.

One or more microphones 706 can be included to receive voice input, voice commands, and other audio input. A single microphone can be included. Optionally, two or more microphones can be included for selective beam steering. As with the detachable electronic module (101) described above, a first microphone can be located on a first side of the active strap 102 for receiving audio input from a first direction, while a second microphone can be placed on a second side of the active strap 102 for receiving audio input from a second direction. In response to a sensor, perhaps located in the detachable electronic module (101), a user location direction can be determined. The control circuit 701 can then select between the first microphone and the second microphone to beam steer audio reception toward the user. Alternatively, the control circuit 701 can employ a weighted combination of the microphones to beam steer audio reception toward the user.

A near field communication circuit 707 can be included for communication with local area networks. A global positioning system device 708 can be included for determining location information. One or more audio output devices 709 can be included to deliver audio output to a user. Piezoelectric devices 710 can be configured to both receive input from the user and deliver haptic feedback to the user.

Where desired, one or more wellness sensors 711 can be included as well. As described above, the wellness sensors 711 can include a heart monitor, moisture detector, temperature monitor, pulse monitor, galvanic devices, and so forth.

Tension and/or pressure sensors 712 can be used to determine when the active strap 102 is being worn or is otherwise coupled to a wearer or is otherwise secured. The tension and/or pressure sensors 712, which are operable with the control circuit 701 of the active strap 102, the control circuit 701 of the detachable electronic module (101), or combinations thereof, can be configured to determine whether the active strap 102 of a wearable electronic device has a tension force applied in excess of a predetermined threshold indicative of the strap being worn. One example of the predetermined threshold is 0.5 lbs of force. Alternatively, the pressure sensors can be placed within a clasp or buckle of the active strap to determine when the clasp or buckle is closed.

Figure 8:
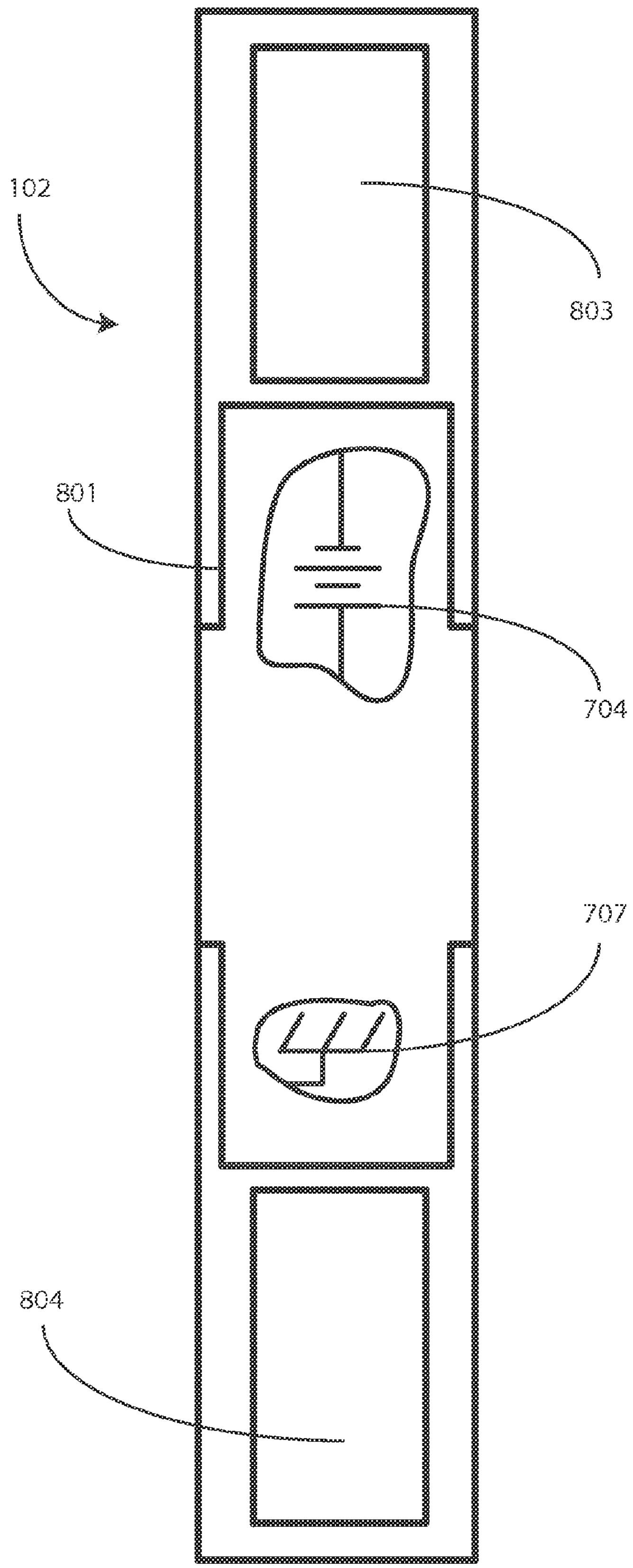
FIG. 8 illustrates a cut-away view of one explanatory wearable component suitable for use with an electronic device configured in accordance with one or more embodiments of the invention.

Turning now to FIG. 8, illustrated therein is a cut-away view of the active strap 102 that demonstrates illustrative locations of some of the components shown in FIG. 7. In this illustrative embodiment, the display (703) comprises a first display 803 disposed on a first side of the active strap 102 and a second display 804 disposed on a second side of the active strap 102. The first display 803 and the second display 804 are flexible displays, and cover substantial portions of the outer surface of the upper face of the active strap 102. Disposition of the displays in this arrangement lends itself to interesting applications. For example, when used with a light sensor (306) of a detachable electronic module (101) coupled to the active strap, the displays can present a color that is complementary to the colors worn by the user, thereby transforming the active strap 102 into a fashion accessory. Alternatively, the displays can present data, images, video, or other indicia to the user.

The battery 704 in this illustrative embodiment has been disposed beneath an attachment bay 801. The attachment bay 801 is configured for attachment to other electronic devices, one example being the detachable electronic module (101) of FIG. 4. Where included, the near field communication circuit 707 can be disposed within the attachment bay 801 as well. Alternatively, the near field communication circuit 707 can be disposed in the outer portions of the active strap 102.

Figure 9:
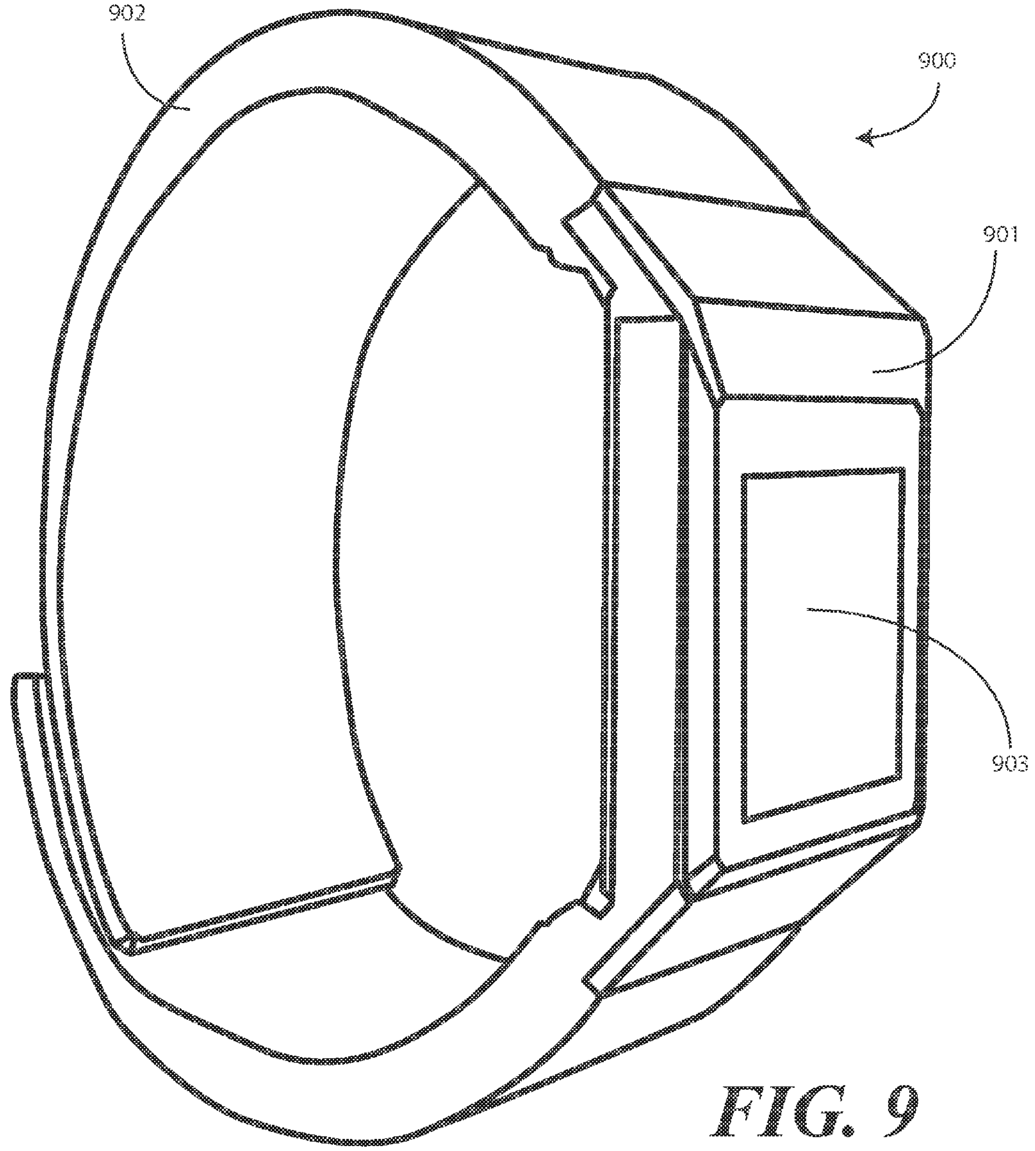
FIGS. 9-12 illustrate various stages of coupling between an explanatory wearable component and an explanatory electronic device configured in accordance with one or more embodiments of the invention.

Turning now to FIG. 9, illustrated therein is another embodiment of an electronic device 900 configured in accordance with embodiments of the present invention. The electronic device 900 is configured as a wearable device. A detachable electronic module 901 is coupled to an active strap 902 to form a wrist wearable device. The illustrative electronic device 900 of FIG. 9 includes a mobile communication circuit (303), a touch sensitive display 903, wellness sensors (334), a near field communication circuit (307), a global positioning system device (308), an infrared sensor (314), twin microphones configured for selective beam steering, and a cover layer configured with piezoelectric sensors (315) so as to function as an acoustic transducer and input control device. Accordingly, the electronic device 900 can function in a telephone mode to not only serve as a personal communication device akin to a mobile telephone, but can also function in a health monitoring mode to also serve as a personal safety and security device capable of detecting falls, user accidents, user drowsiness, user sleep and sleep patterns. Moreover, the electronic device 900 is capable of sending and receiving emergency alert communication messages, as well as delivering alert notifications to the user. In one or more embodiments, the electronic device 900 can be configured to communicate with social networks to provide automatic wellness and other updates to friends or family. The wearable electronic device 900 functions as a wearable wireless communication device that is compact and includes wellness sensing capabilities. The electronic device 900 has an efficient, compact design with a simple user interface configured for efficient operation with one hand (which is advantageous when the electronic device 900 is worn on the wrist).

In addition to the touch sensitive input of the touch sensitive display 903, the electronic device 900 is further equipped with an accelerometer (313) that can detect movement. Accordingly, when the electronic device 900 is worn on a wrist, the user can make gesture commands by moving the arm in predefined motions. Additionally, the user can deliver voice commands to the electronic device 900 via the twin microphones.

The user interface of the electronic device 900 is specially designed for a small screen. It included an intuitive touch interface. When the piezoelectric sensors (315) in conjunction with the cover layer of the touch sensitive display 903 are utilized as a touch interface, special functions can be realized. For example, the cover layer can be pressed for a short time, e.g., less than two seconds, to power on and off the electronic device 900. Alternatively, the cover layer can be pressed for a long time, e.g., more than two seconds, to perform a special function, such as transmission of an emergency message.

When the touch sensitive display 903 is configured as a touch sensitive display, control input can be entered in some embodiments with a single swiping action across the surface of the touch sensitive display 903. When operating in conjunction with the piezoelectric sensors (315), the touch sensitive display 903 can deliver intelligent alerts, acoustics, and haptic feed back in addition to visual output. In one or more embodiments, the touch sensitive display 903 is configured to alter magnification of the visual output for special applications. For instance, the touch sensitive display 903 can alter the magnification of a keypad during mobile communication dialing operations.

Using the near field communication circuit (307), the electronic device 900 can communicate with other electronic devices to provide "device to device" connectivity. For example, the electronic device 900 can link to a tablet-style computer to permit viewing of the visual output of the touch sensitive display 903 on a larger screen. Alternatively, the electronic device 900 can connect to external devices such as monitors, speakers, or other devices and wirelessly deliver audio, video, or combinations thereof to another electronic device disposed within a near-field communication radius of the electronic device 900. The electronic device 900 can further serve as a communication portal for the peripheral device, providing telephony functionality, messaging functionality, and notification functionality for the tablet-style computer.

As the electronic device 900 is configured with a small form factor in a wearable configuration, it provides advantages over prior art devices. For example, with prior art devices, a user employing a tablet-style computer frequently had to carry a mobile telephone to provide communication capability for the tablet-style computer. The wearable nature of the electronic device 900 alleviates the need to carry a large communication device for device-to-device connectivity with portable computers or tablet style computers. Moreover, the wearable nature of the electronic device 900 is compact and simple for a user to carry.

The inclusion of wellness sensors (334) provides advantageous applications in the area of wellness and health. For example, the medical profile (321) permits a user to store a medical history or wellness profile in the electronic device 900. Applications operable on the electronic device 900 can then draw on this information to provide wellness applications that are specifically tailored to the wearer. Additionally, sensors like the heart monitor (316), pulse monitor (318), and temperature monitor (317) can continually monitor vital signals of the user while the electronic device 900 is worn. By maintaining a record of this monitoring in the medical profile (321), the electronic device can provide a wellness assessment by analyzing the data. Sleep can be detected based upon pulse and temperature. Additionally, high-risk situations can be detected from elevated pulse, heartbeat, and excessive perspiration.

Applications operable on the electronic device 900 can provide timely wellness and health reminders, such as when a user should ingest medicine or when the user should exercise. Further, wellness outcomes, such as the results of an exercise session, can be presented on the touch sensitive display 903. The wellness sensors (334) can be configured to monitor vital signals only upon predetermined criteria. For example, when the moisture detector (319) detects moisture, the wellness sensors (334) may presume the user is exercising and actuate vital sign monitoring. The wellness sensors (334) can be configured to make wellness recommendations based upon location, history, and/or activity. The wellness sensors (334) can be configured to provide early warnings that anticipate health events based upon data detected using onboard sensors. The wellness sensors (334) can be configured to automatically journal daily physical and wellness activity. The wellness sensors (334) can be configured to provide real time updates to trusted family members, friends, or medical service providers.

The wellness sensors (334) can be configured to automatically deliver messages to third parties, e.g., doctors, family members, or friends, when abnormal wellness conditions are detected. As noted above, in one or more embodiments, a user can send such a message by pressing the cover layer of the touch sensitive display 903 for a predetermined time. The wellness sensors (334) can be configured to detect falls, auto accidents, extended lack of motion of a wearer, or sleep. This will be described in more detail with reference to FIG. 24 below. In one embodiment, the wellness sensors (334) can be configured to provide awakening alerts to the user when drowsiness or sleep is detected.

Figure 10:
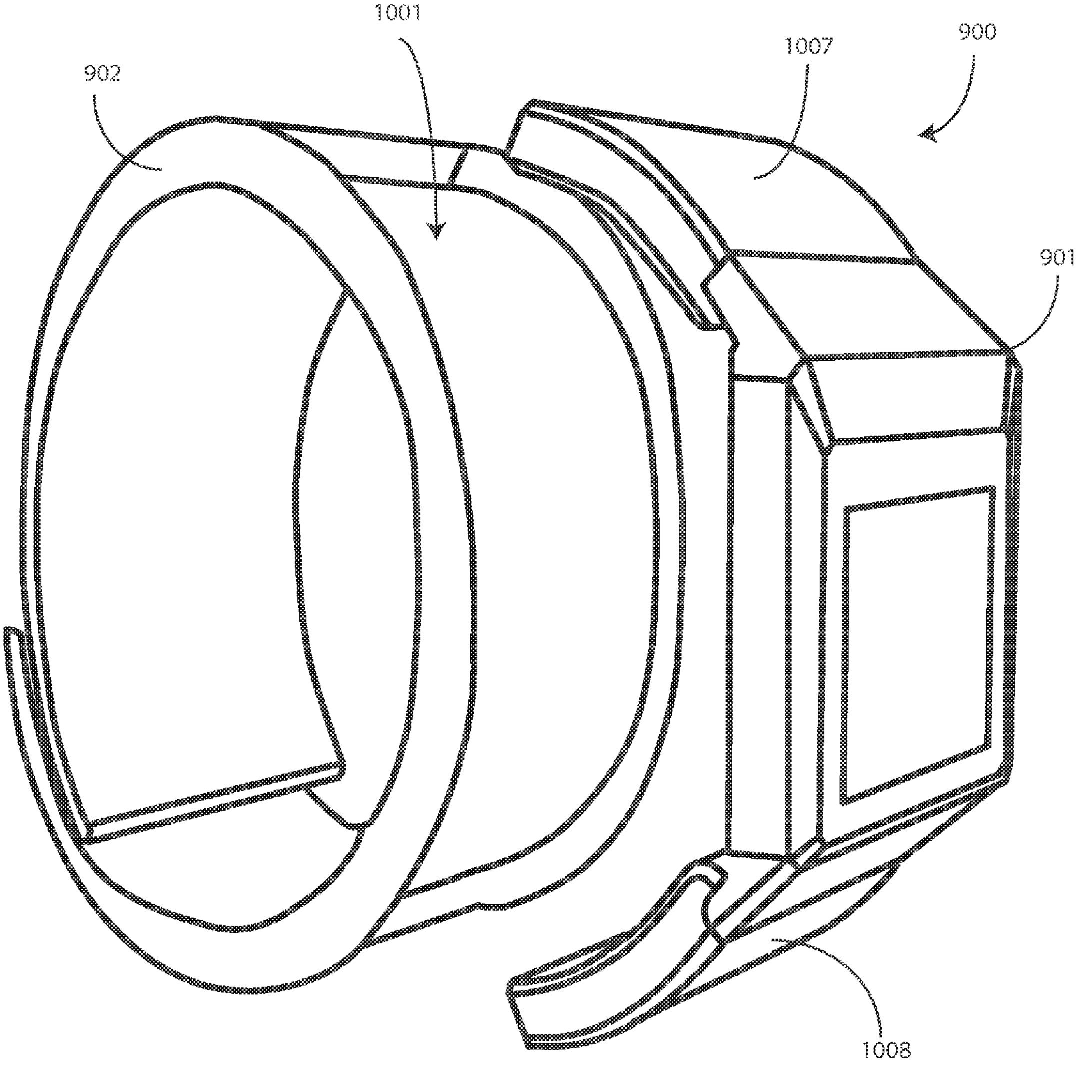

Turning now to FIG. 10, the detachable nature of the detachable electronic module 901 from the active strap 902 is shown. In this illustrative embodiment, the detachable electronic module extensions 1007,1008 are non-planar, in that they are curved in cross section. This geometric configuration provides a wearable configuration for the detachable electronic module 901 in that the non-planar geometries of the detachable electronic module extensions 1007,1008 are complementary to the shape of a wearer's arm. Where this is the case, energy storage devices disposed within the detachable electronic module extensions 1007,1008 can be non-planar as well.

In FIG. 10, the detachable electronic module 901 has been released from the attachment bay 1001, thus converting it to a stand-alone device that can be used individually by the user or docked for use with other devices. In addition to providing wearable capabilities for the overall electronic device 900, the active strap 902 can be used for a stand. Since it is an active device with hardware and a power source, the active strap 902 can remain on the wrist to monitor wellness or other conditions while the detachable electronic module 901 is not connected. Upon reconnection, the detachable electronic module 901 can retrieve such monitored data and process it or communicate it as directed by a particular application.

Figure 11:
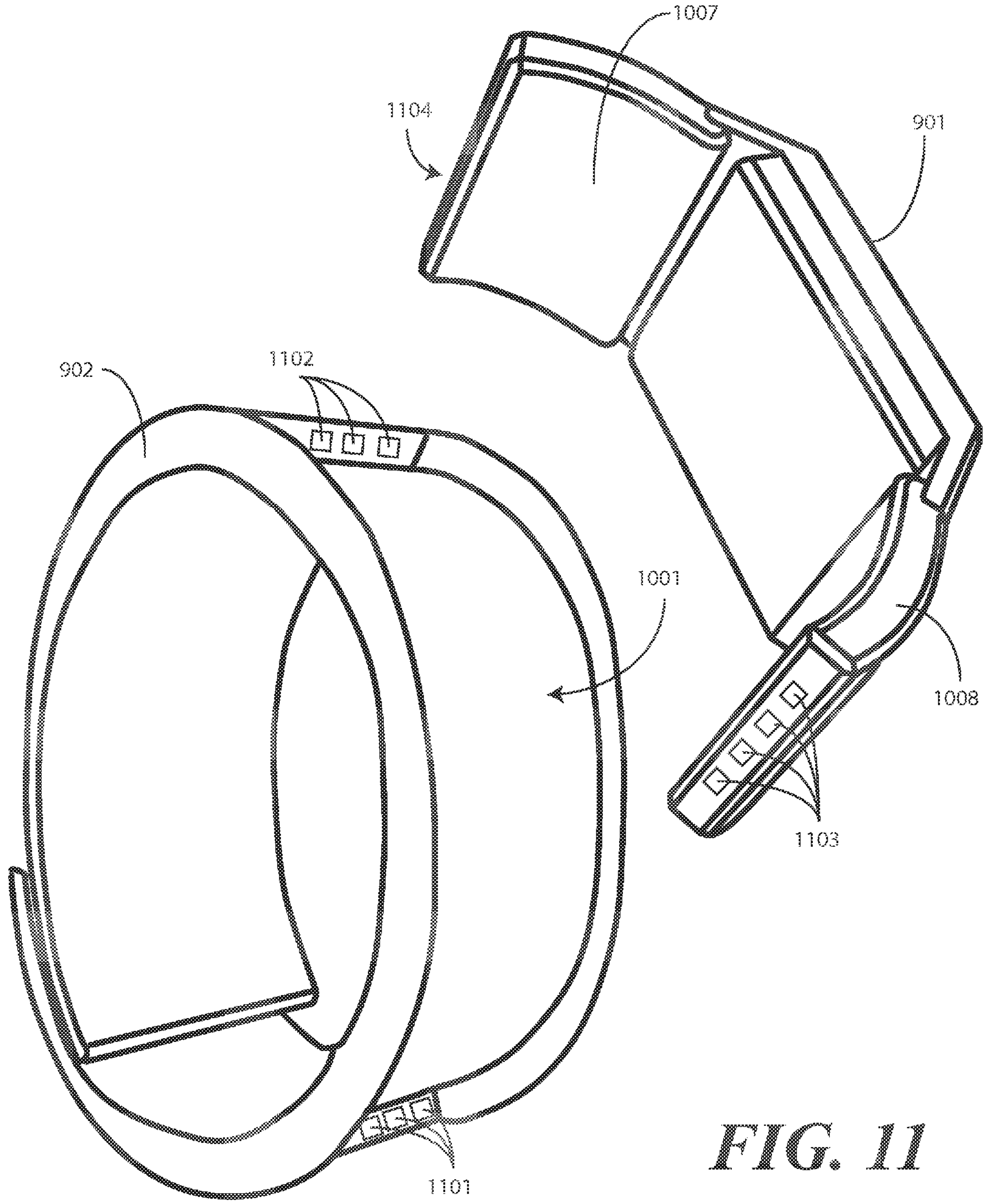

Turning now to FIG. 11, the detachable electronic module 901 has been rotated to reveal electrical couplings 1101,1102, 1103,1104 that allow the detachable electronic module 901 and the active strap 902 to work in tandem. In this illustrative embodiment, the attachment bay 1001 includes electrical couplings 1101,1102 that mate with complementary electrical couplings 1103,1104 disposed on the detachable electronic module extensions 1007,1008. The location of these electrical couplings 1101,1102,1103,1104 is illustrative only. Other electrical coupling embodiments will be described below. The tension and/or pressure sensors (712) of the active strap 902 can deliver information to the detachable electronic module 901 through these electrical couplings 1101,1102, 1103,1104.

Figure 12:
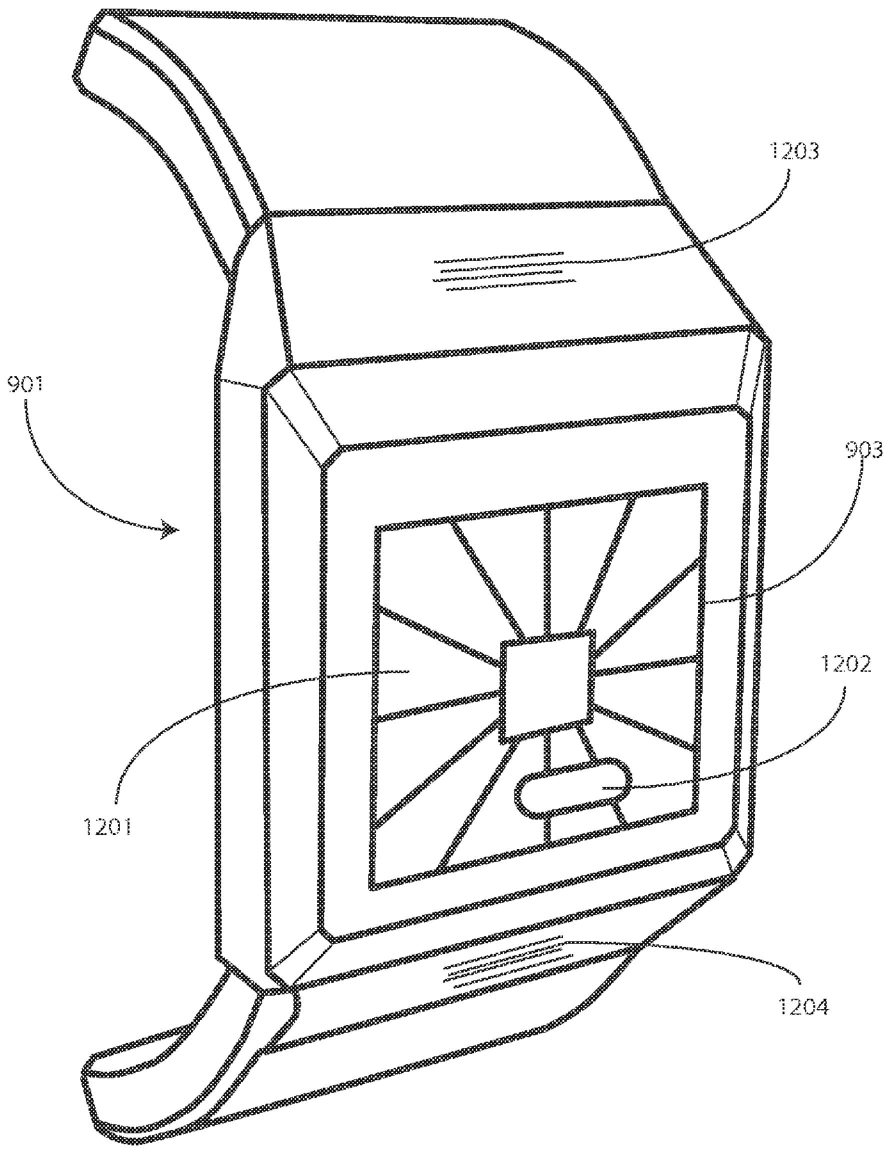

Turning to FIG. 12, the detachable electronic module 901 is shown by itself with one example of visual output 1201 being presented on the touch sensitive display 903. The visual output 1201 in this embodiment is a telephone dialer, as the detachable electronic module 901 is operating in a telephone mode. As noted above, in one or more embodiments, the control circuit (301) of the detachable electronic module 901 can be configured to alter one of a color, a resolution, a scaling, an operating mode, or a magnification of the visual output 1201. For example, one or more of these characteristics can be altered when the control circuit (301) determines that clothing is covering the detachable electronic module 901, its corresponding strap, or combinations thereof.

Figure 13:
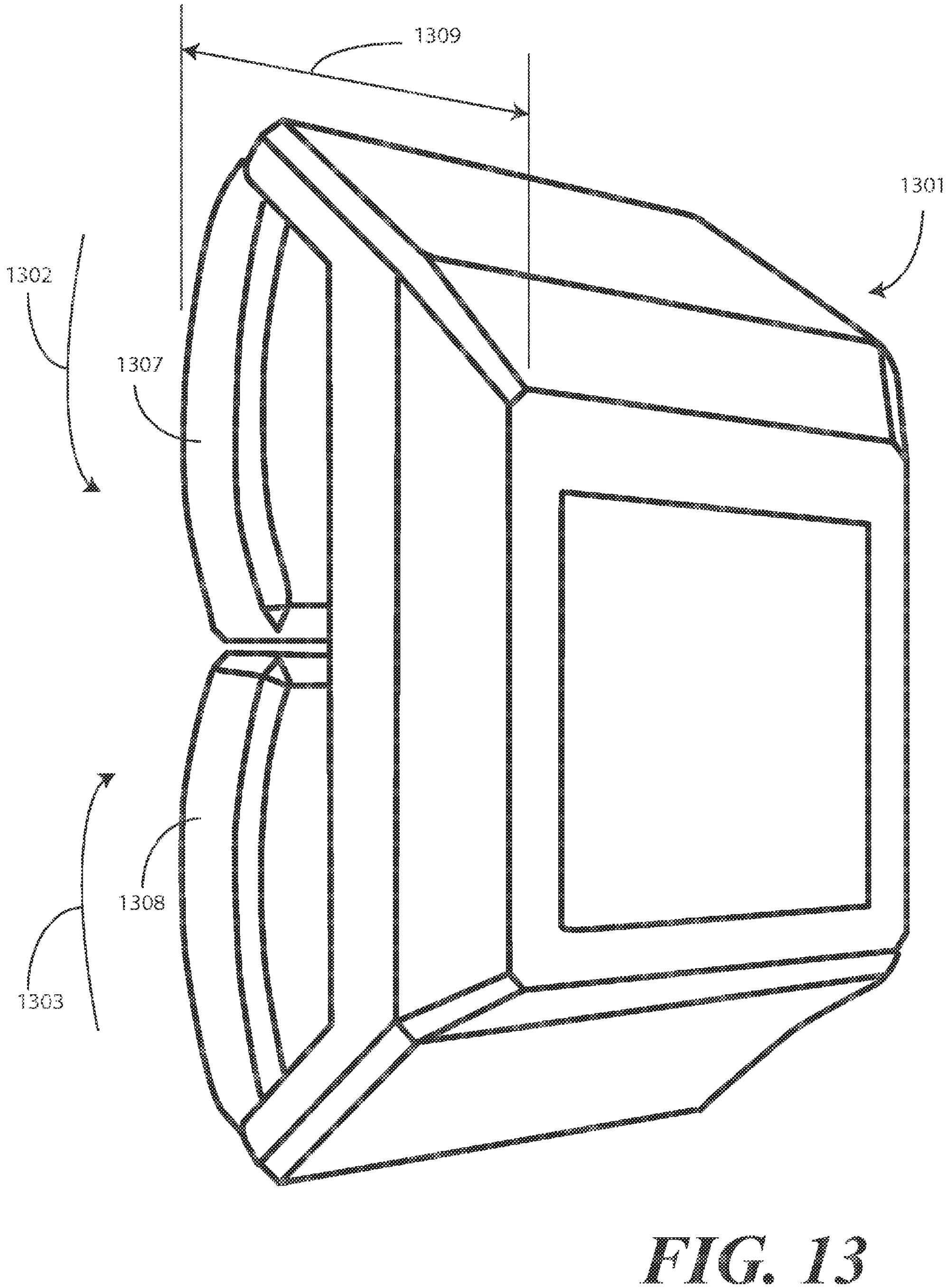
FIG. 13 illustrates one explanatory electronic device having collapsible components configured in accordance with one or more embodiments of the invention.

Turning to FIG. 13, illustrated therein is an optional mechanical feature associated with one detachable electronic module 1301 configured in accordance with one or more embodiments of the invention. As shown in FIG. 13, the detachable electronic module extensions 1307,1308 are coupled to the detachable electronic module 1301 with folding hinges and have been folded 1302,1303 about the rear side of the detachable electronic module 1301. This position is referred to a "closed" position because the detachable electronic module extensions 1307,1308 are disposed against a major face, i.e., the back surface, of the housing of the detachable electronic module 1301. This collapsible feature allows the detachable electronic module 1301 to become a more compact device when being used in the absence of a passive or active strap. Additionally, the collapsible feature can allow a user to alter the operational modes of the detachable electronic module 1301 by moving the detachable electronic module extensions 1307,1308 relative to the central housing of the detachable electronic module 1301.

In this illustrative embodiment, each detachable electronic module extension 1307,1308 is equipped with pivoting power and ground contacts so that power from the cells disposed within the detachable electronic module extensions 1307, 1308 deliver power to the control circuit and other components in the detachable electronic module 1301 regardless of their radial orientation relative to the detachable electronic module 1301. In this illustrative embodiment, the detachable electronic module 1301 has a thickness 1309 of between twenty and thirty millimeters.

While the detachable electronic module extensions 1307, 1308 are shown completely folded in FIG. 13, it should be noted that the folding hinges can be configured to be resistive so as to be pivotable to any number of rotational orientations as desired by a user. For example, each detachable electronic module extension 1307,1308 can be rotated halfway so as to serve as a stand when the detachable electronic module 1301 is placed on its side. In one or more embodiments, the detachable electronic module extensions 1307,1308 are coupled to the central housing of the detachable electronic module with a detented hinge that provides pseudo mechanical stops so that the detachable electronic module extensions 1307,1308 can be easily stopped at a variety of pre-defined angularly displaced orientations relative to the central housing of the detachable electronic module 1301. In such an embodiment, the detented hinge comprises a plurality of detent stops configured to hold the one or both of the first detachable electronic module extension 1307 or the second detachable electronic module extension 1308 in one of a plurality of angularly displaced alignments relative to the housing.

Figure 14:
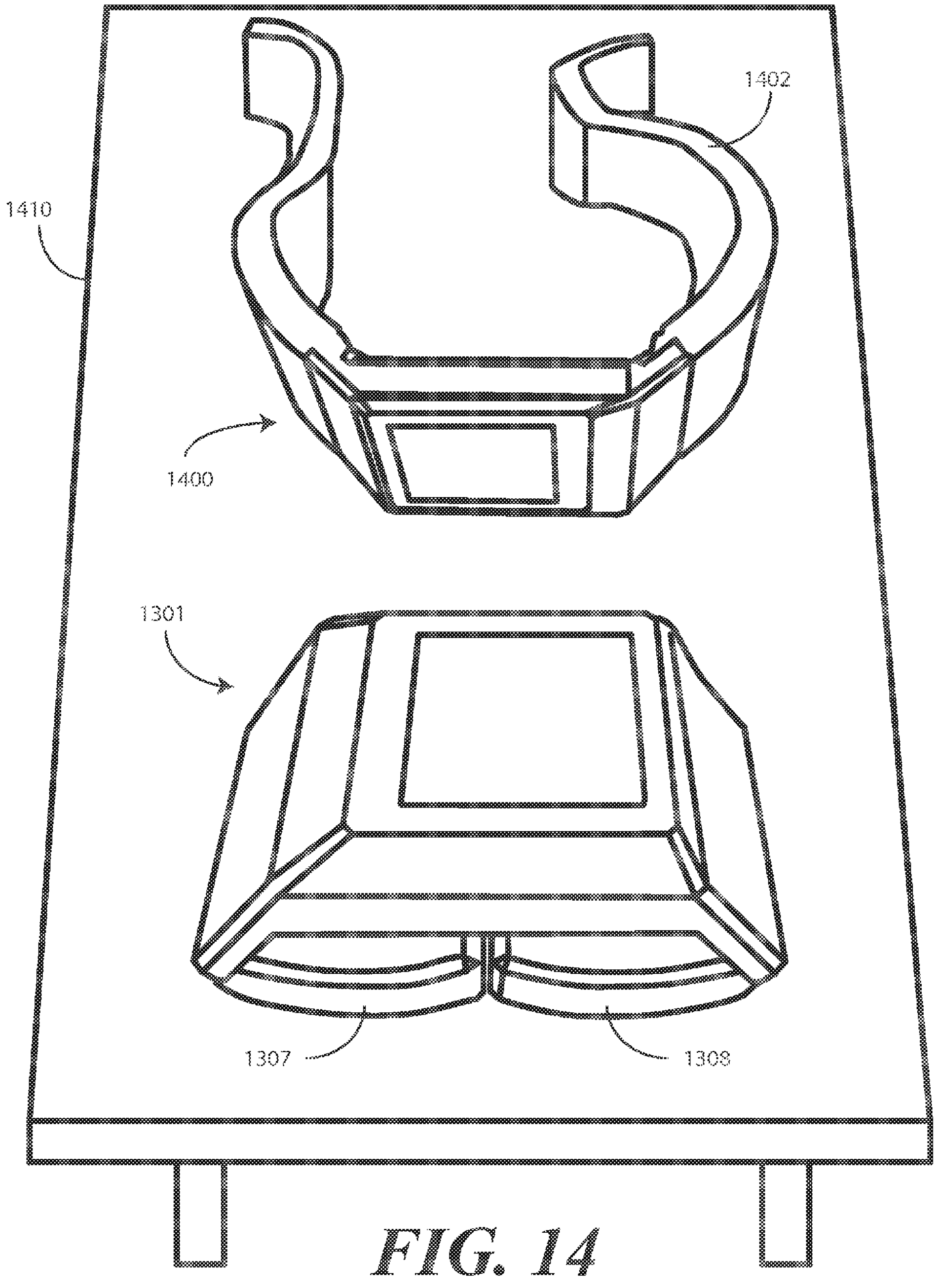
FIG. 14 illustrates an explanatory wearable component having been separated from an explanatory electronic device configured in accordance with one or more embodiments of the invention.

Turning to FIG. 14, illustrated therein are the detachable electronic module 1301 of FIG. 13 and an electronic device 1400 placed on a table 1410. FIG. 14 illustrates a few of the many options for using the electronic devices configured in accordance with embodiments of the invention when not being worn. The detachable electronic module extensions 1307,1308 have been folded about detachable electronic module 1301. The detachable electronic module 1301 has then been placed face up, with each detachable electronic module extension 1307,1308 serving as a stand. This configuration can be useful, for example, when multiple people are using the detachable electronic module 1301 as a speakerphone during a group call. Further, the active strap to which the detachable electronic module 1301 was coupled can remain on the wrist performing wellness monitoring. With electronic device 1400, the active strap 1402 has been straightened from its wearable configuration to serve as a stand. This configuration can be useful, for example, when using the electronic device 1400 as an alarm clock.

Figure 15:
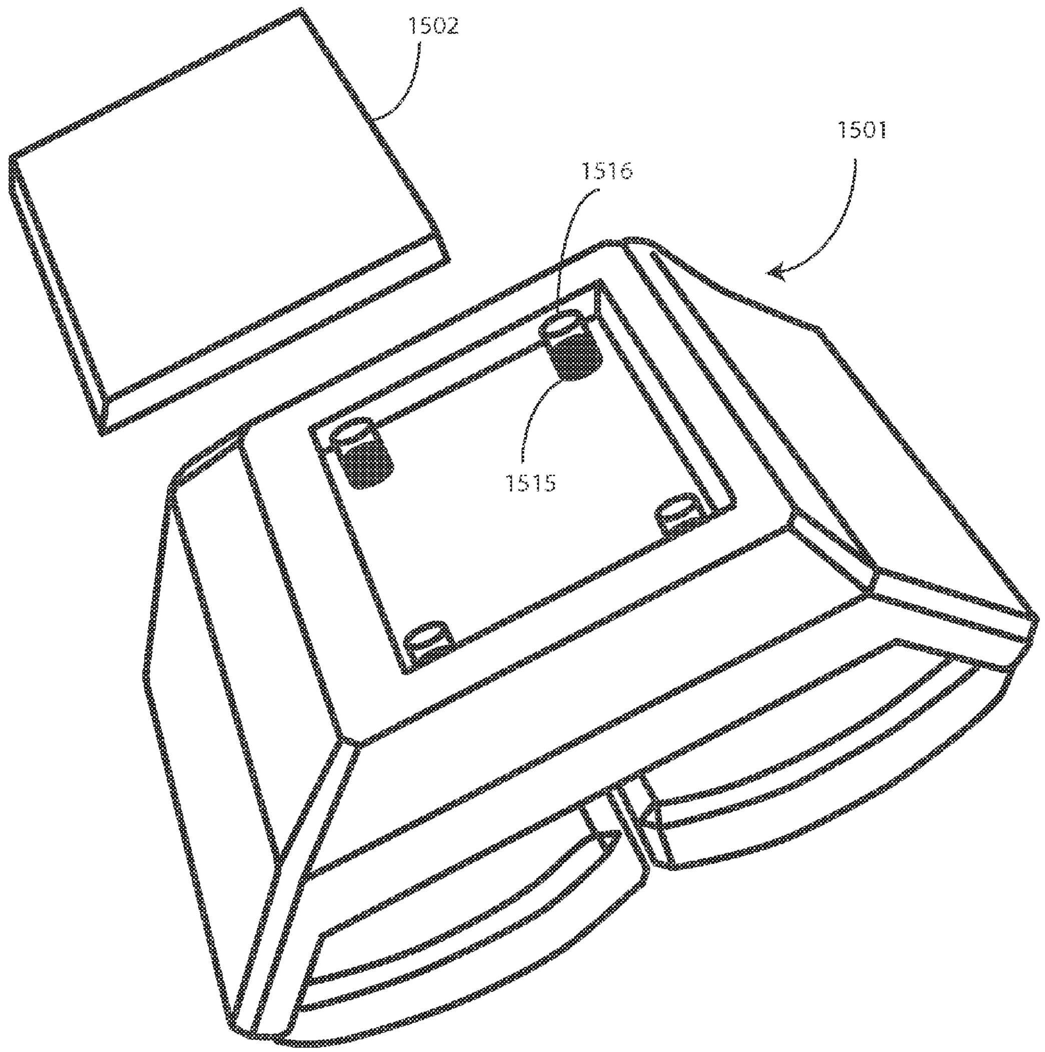
FIG. 15 illustrates an exploded view of one explanatory electronic device having a display lens configured as an acoustic output transducer in accordance with one or more embodiments of the invention.

Turning now to FIG. 15, a detachable electronic device 1501 having piezoelectric devices 1515 configured work with the cover layer 1502 of the display to provide input and output capabilities. Piezo frame elements 1516 function as mechanical couplers between the cover layer 1502 and the piezoelectric devices 1515. The control circuit disposed within the detachable electronic device 1501 is operable with the piezoelectric devices 1515. The control circuit can actuate the piezoelectric devices 1515 to employ them as output devices. Alternatively, when forces act upon the piezo frame elements 1516, those forces are transferred to the piezoelectric devices 1515, thereby delivering signals to the control circuit. Accordingly, the piezoelectric devices 1515 can be used as either input or output devices.

The inclusion of the piezoelectric devices 1515 provides many advantageous functions to the detachable electronic device 1501. As noted above, when the cover layer 1502 is touched or pressed by a user, the cover layer 1502 becomes an input control device for receiving user input. The piezoelectric devices 1515 can sense this input and deliver a corresponding signal to the control circuit. By using multiple piezoelectric devices 1515 that are spread out within the detachable electronic device 1501, the signals can be read individually to determine an approximate location along the cover layer 1502 contacted by the user. In this manner, the cover layer 1502 can be used as a navigation device by defining, for example, a "left edge press" with a different function from a "right edge press," and so forth.

The cover layer 1502 can also be used as an output. In one or more embodiments, the control circuit actuates the piezoelectric devices 1515 in accordance with an audio signal to use the cover layer 1502 as an audio transducer. Accordingly, the cover layer becomes a loudspeaker through which audio output can be delivered to a user. In some embodiments, the control circuit can actuate the piezoelectric devices 1515 in accordance with pulse functions to deliver haptic feedback to the user as well.

Figure 16:
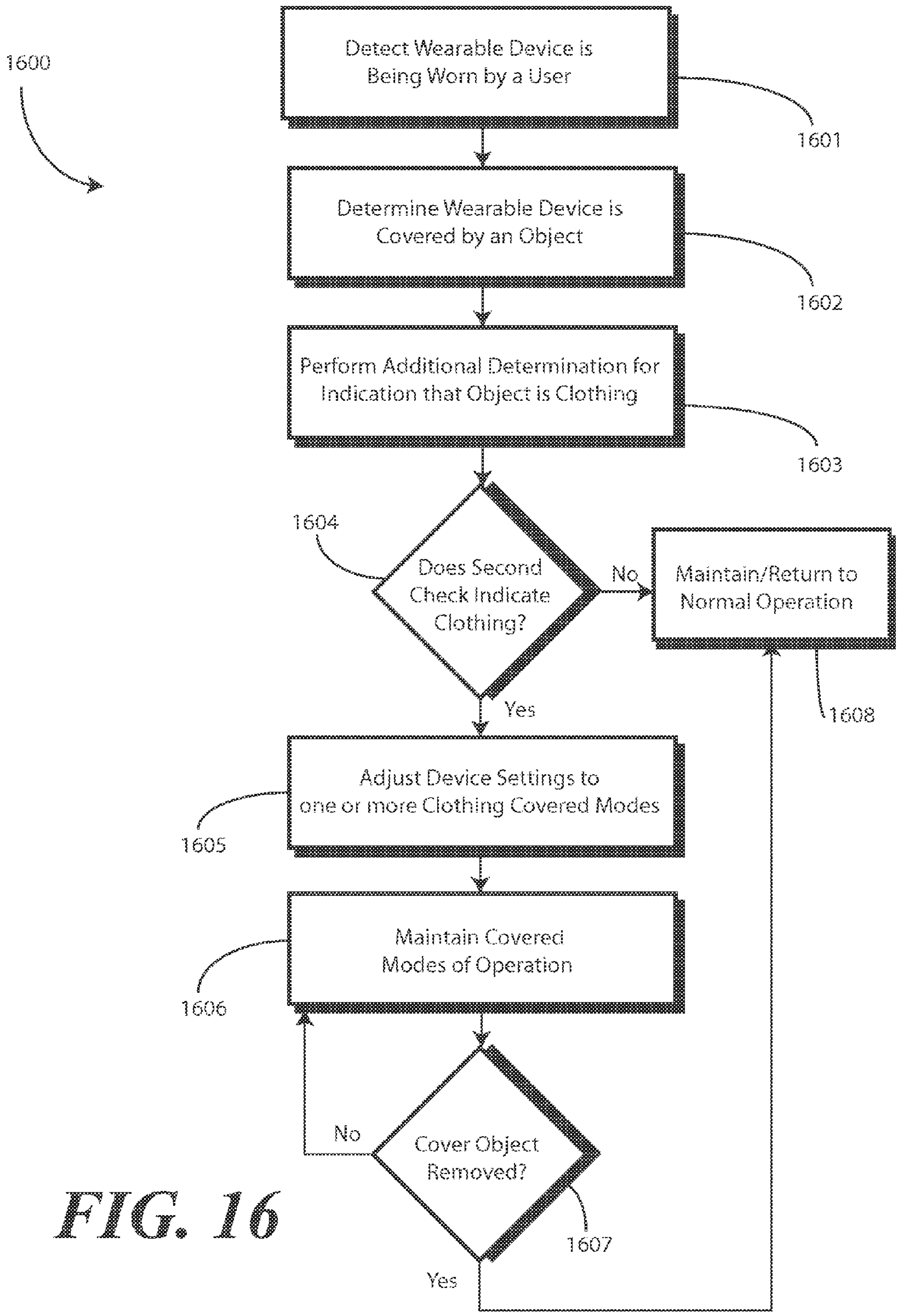
FIG. 16 illustrates one explanatory method of detecting clothing in a wearable electronic device in accordance with one or more embodiments of the invention.

Turning now to FIG. 16, illustrated therein is a method 1600, suitable for an electronic device such as the wearable electronic devices described above, for determining that clothing is covering the electronic device. The method 1600 can be configured as executable code and stored in a memory that is operable with one or more processors to execute the various steps of the method 1600. Alternatively, one or more hardware modules can be configured to execute the steps of the method 1600 as well.

At step 1601, the method 1600 detects whether the wearable electronic device is being worn. In one embodiment, this step 1601 detects whether the wearable electronic device is coupled to the wearer, e.g., strapped about a wrist, being worn about a neck, and so forth. This step 1601 can be performed with the use of at least a first sensor or sensors. One explanatory example of such a sensor is a galvanic skin sensor that is used to determine that the wearer is wearing the device. The skin sensor can detect that the wearable electronic device is proximately located with skin of the wearer. Another explanatory example of such a sensor is a tension sensor deployed in a strap of the wearable electronic device configured to detect that the wearer has the strap secured. Another explanatory example of such a sensor is a pressure sensor, which may be disposed beneath the strap of the wearable electronic device, between the strap and a detachable electronic module of the wearable electronic device, in a clasp or buckle of the wearable electronic device, or in combinations thereof. Such tension and pressure sensors, used alone or in combination, can be configured to detect whether the strap of the wearable electronic device is applying a tension force to the wearable electronic device in excess of a predetermined threshold. As noted above, one example of a predetermined threshold is a force in excess of 0.5 lbs. Other thresholds, for example, 0.25 lbs, 0.33, lbs, 0.15 lbs, 0.75 lbs, and so forth can be used.

At step 1602, the method 1600 determines whether the wearable electronic device is covered. As with step 1601, step 1602 can be performed by at least a second sensor or sensors. In one illustrative embodiment, the second sensor can be an infrared sensor configured to detect that the wearable electronic device has been covered for an extended period of time. The infrared sensor can determine the same by detecting a saturation state resulting from high levels of reflected signals received from the covering object. In another embodiment, cameras or image capture devices can detect that the wearable electronic device is covered by capturing images of proximately located objects. Of course, combinations of these sensors can be used. Further, additional sensors will be obvious to those of ordinary skill in the art having the benefit of this disclosure.

At optional step 1603, in response to the determination of step 1602, the method 1600 can perform an additional determination to increase a probability that the wearable electronic device is covered with clothing. Step 1603 helps to prevent false positives by attempting to further identify that the covering object is clothing. Illustrating by example, step 1602 may determine that the wearable electronic device is covered when the user rests his wrist upside down on a desk. The desk covers the device, but is not clothing. In an effort to increase the probability that the covering object is in fact clothing, step 1603 can be performed. In one embodiment step 1603 performs an additional determination to provide further confirmation regarding whether the wearable electronic device is covered with clothing.

As with steps 1601 and 1602, step 1603 can be accomplished in conjunction with one or more sensors. In one embodiment, the sensors used in step 1603 are different from those used in step 1602. Generally stated, the sensors used in step 1603 can be at least a third sensor or sensors that are different from the second sensors used in step 1602. The second sensor or sensors determine that the wearable electronic device is covered, while the third sensor or sensors perform a secondary check to obtain a positive indication that the object is the clothing.

Examples of the third sensor or sensors include an array of microphones. The microphones can be actuated at step 1603 to detect a noise profile corresponding to a clothing object covering the wearable electronic device. The noise profile can be a muffled sound caused by the proximately located clothing. In one embodiment, the noise profile is a stored acoustic profile of a covered wearable electronic device having different clothing materials, e.g., cotton, silk, wool, leather, and so forth, that has been previously recorded in factory setting during rubbing and/or covering actions. This profile can indicate noises and/or alterations caused by the clothing, as well as spectral changes in reflected noise. The profile can be stored in a memory of the wearable electronic device for match comparison performed at decision 1604.

Another example of the third sensor or sensors includes a capacitive or other electrical sensor configured to determine conductance. Such a sensor can determine whether the object covering the wearable electronic device is electrically conductive. Wool tends not to be electrically conductive, while a metal drawer would be conductive. The conductivity of the surrounding material may indicate whether the covering object is clothing.

Figure 17:
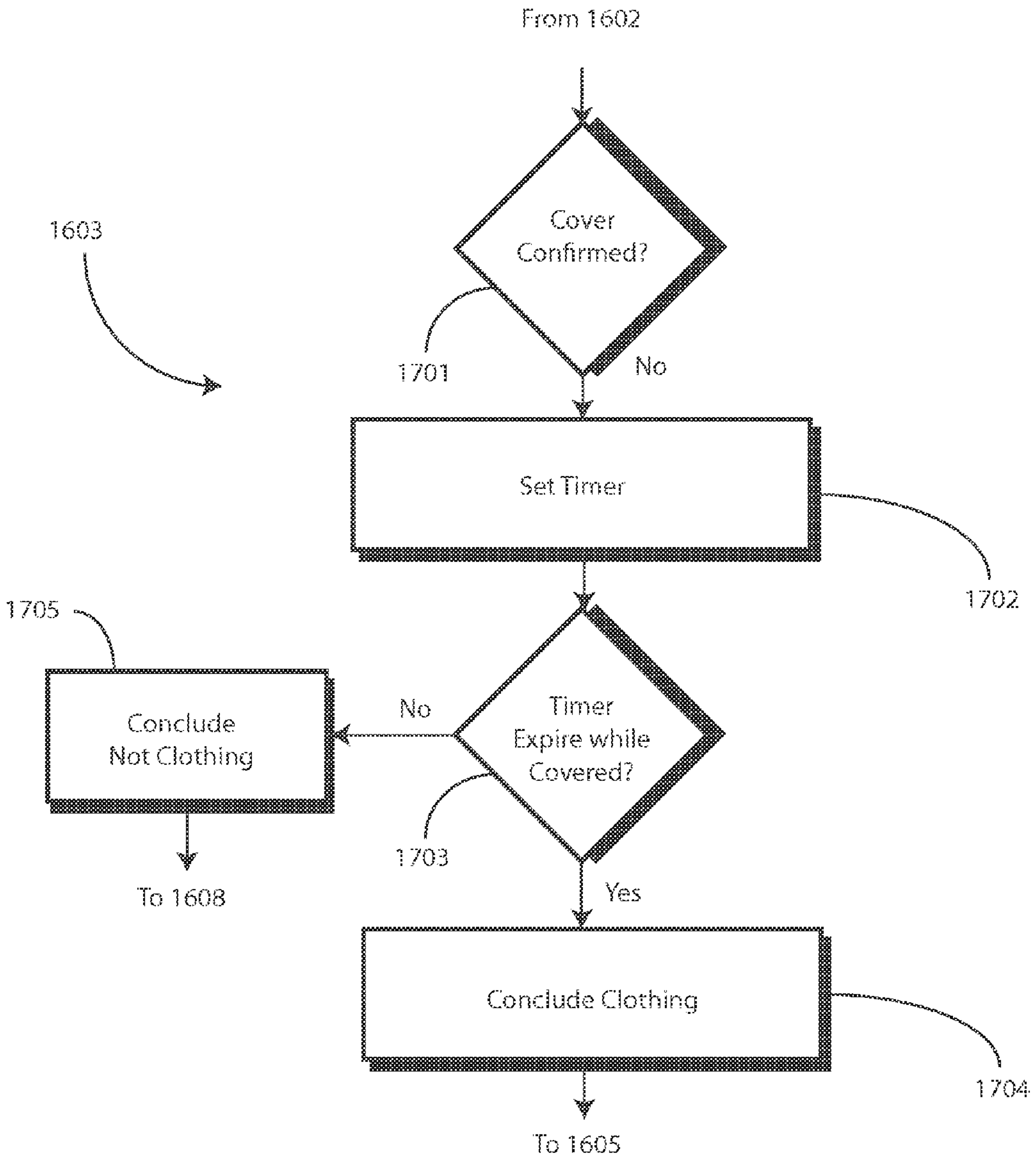
FIG. 17 illustrates one explanatory method for performing an optional confirmation check whether a covering object is clothing in accordance with one or more embodiments of the invention.

In one embodiment, hysteresis can be added to ensure not only that the device is covered, but that is covered for a sufficiently long amount of time. While the operational mode of the wearable electronic device can be changed by user control settings, such as when covered by an object other than clothing, in many cases a user may not want the operational modes or output settings changed when the wearable electronic device is only briefly covered. Turning briefly to FIG. 17, illustrated therein is one explanatory series of steps illustrating how this can occur.

From step 1602 of FIG. 16, it is determined at decision 1701 that an object is covering the wearable electronic device. At step 1702 a timer is set for a predetermined amount of time. The amount of time can vary based upon application. Examples of predetermined times include 5 seconds, 10 seconds, 30 seconds, 2 minutes, 5 minutes, and so forth. In one or more embodiments, the predetermined time can be set by the user. Moreover, the user may additionally define what action is to be taken, i.e., how the operational mode will change, for any predefined times defined by the user.

Whether the timer expires while the wearable electronic device is covered is determined at decision 1703. Where the wearable electronic device was covered for the duration of the timer, step 1603 concludes that it is clothing covering the wearable electronic device at step 1704. Where the device was uncovered while the timer was running, step 1603 can conclude that the object covering the wearable electronic device was not clothing at step 1705. The wearable electronic device may have been covered in passing by a hand or other object. The steps shown in FIG. 17 work well in practice because clothing tends to be worn for extended time periods. A user is not likely to repeatedly don and remove clothing. By contrast, any number of passing objects can momentarily cover the device, including paper, hands, desks, and so forth. The steps of FIG. 17 ensure consistent operation of the wearable electronic device when not covered by clothing.

Figure 18:
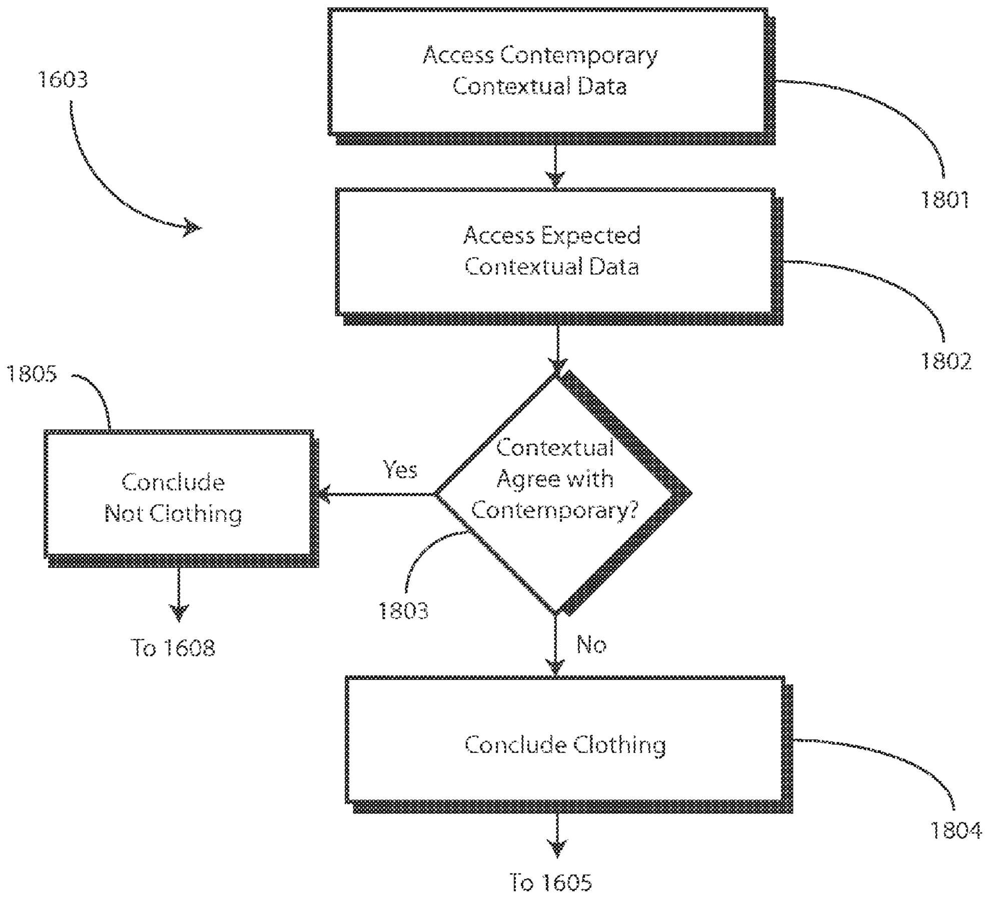
FIG. 18 illustrates another explanatory method for performing an optional confirmation check whether a covering object is clothing in accordance with one or more embodiments of the invention.

There are other ways of performing the secondary check of step 1603 as well. Turning briefly to FIG. 18, illustrated therein is one explanatory example.

As shown in FIG. 18, rather than confirming that clothing is covering the device by coverage time as was shown in FIG. 17, contextual data is consulted. In this illustrative embodiment, step 1603 comprises accessing contemporary contextual data of the wearable electronic device, accessing expected contextual data based upon one or more of time, temperature, date, environment, ambient lighting near device, about the wearable electronic device, weather within a predetermined vicinity of the wearable electronic device, motion of the wearable electronic device, illumination of the wearable electronic device, location of the wearable electronic device, operational mode of the device, e.g., when the device is in a communication mode, or combinations thereof, and comparing the contemporary contextual data with the expected contextual data.

Explaining by way of example, at step 1801 contextual data is accessed. Recall from above that the wearable electronic device has a control circuit that is operable with a variety of sensors. The wearable electronic device may consult a temperature sensor to detect ambient temperature as contextual data. Alternatively, the wearable electronic device may consult a moisture sensor to determine whether the wearable electronic device is wet. Alternatively, the wearable electronic device may consult a light sensor to determine whether ambient light is illuminating the wearable electronic device. Alternatively, the wearable electronic device may consult a location sensor to determine the location of the wearable electronic device or whether the wearable electronic device is inside a building or structure or outside. Of course, combinations of these contextual data can be accessed at step 1801 as well. Further, other contextual data will be obvious to those of ordinary skill in the art having the benefit of this disclosure.

Once the current contextual data is accessed at step 1801, expected contextual data can be accessed at step 1802. Illustrating by example, the wearable electronic device may use a communication circuit to consult a weather service to obtain weather information as expected contextual data to determine the expected ambient temperature or season. Alternatively, the wearable electronic device my consult a clock to determine the time of day as expected contextual data. Other examples of expected contextual data will be obvious to those of ordinary skill in the art having the benefit of this disclosure.

After obtaining both the contextual data and the expected contextual data, a comparison can be made at decision 1803 to further determine whether the covering object is in fact clothing. If, for example, step 1802 reveals that it is 1:15 PM, which means that sun should be shining, and step 1801 reveals that no ambient light is illuminating the wearable electronic device, step 1804 can conclude that a covering object is indeed clothing. Similarly, if step 1802 reveals that rain is expected, and step 1801 reveals that the wearable electronic device is dry and not wet, step 1804 can conclude that the covering object is clothing. (Note that multiple confirmation steps can be performed as well. For example, in addition to comparing contextual data, a tertiary check can be performed by, in one embodiment, employing a sensor to also determine whether the covering object is conductive.)

By contrast, where the contextual data matches the expected contextual data, step 1805 can conclude that no clothing is covering the object. If step 1802 reveals that the ambient temperature is expected to be 55 degrees, and step 1801 reveals that a detected temperature is 58 degrees, step 1805 can conclude that no clothing is covering the object because the wearable electronic device is not being thermally warmed by the wearer's body heat being captured by the clothing.

Turning back to FIG. 16, where decision 1604 indicates that the covering material is likely to be clothing, i.e., where the additional determination of step 1603 is positive, the method 1600 in one embodiment adjusts one or more device settings of the wearable electronic device at step 1605. Where decision 1604 indicates that the covering object is likely not clothing, two actions can occur. First, in one embodiment, normal operation can continue at step 1608. Optionally, the method 1600 can adjust another function or operational mode at step 1609 when clothing is not detected. For example, when a wearable electronic device is temporarily covered by a hand, in one embodiment the method 1600 can convert visible notifications to audio, and so forth.

Figure 19:
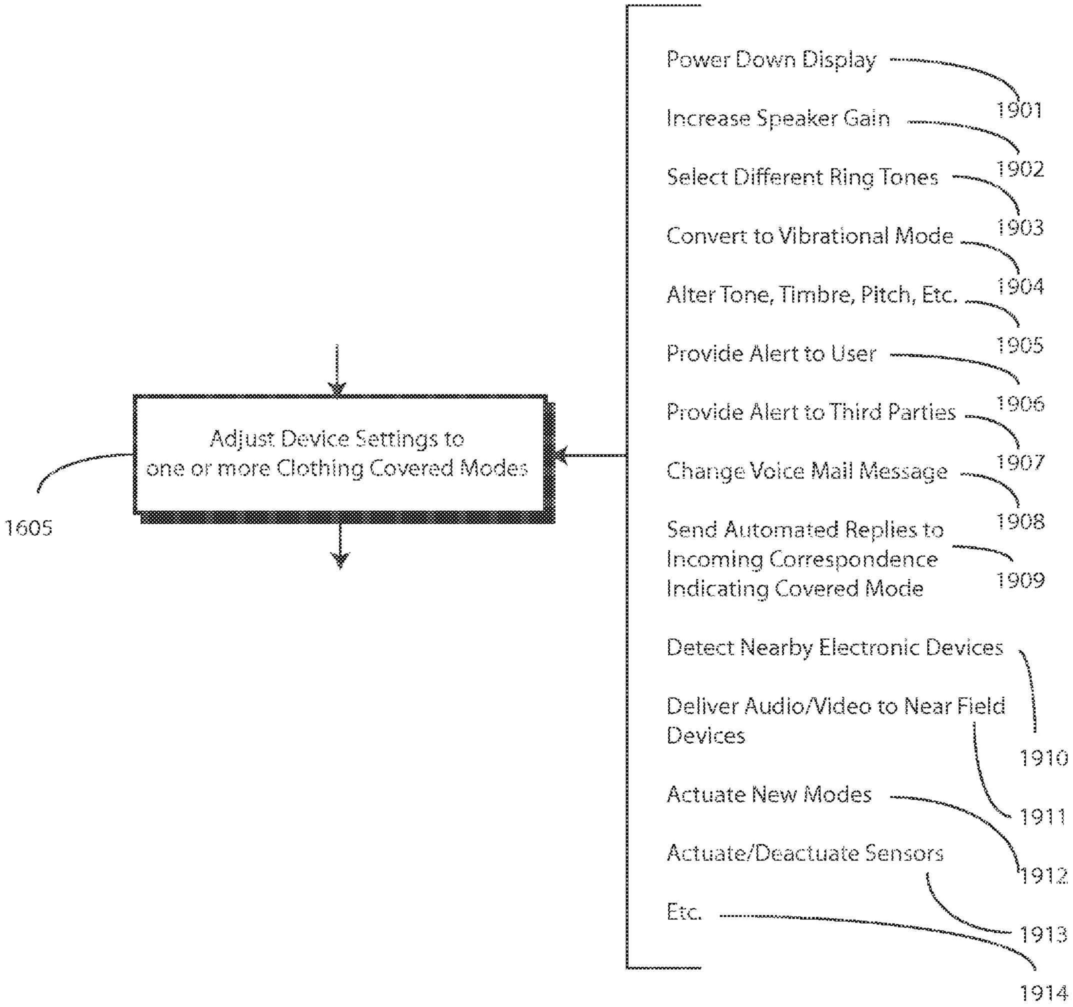
FIG. 19 illustrates examples of operational mode and feature options that can be changed in a wearable device when covered by clothing in accordance with one or more embodiments of the invention.

The adjustment of step 1605 can take a variety of forms. Turning now to FIG. 19, illustrated therein are a few explanatory examples. In a first embodiment, step 1605 can include causing the wearable electronic device to enter a power saving operational mode 1901. In another embodiment, step 1605 can include adjusting an output gain 1902 of one or more audio output devices. For example, the volume of loudspeakers can be increased when the wearable electronic device is covered by clothing.

In another embodiment, step 1605 can include adjusting comprises changing an output notification 1903 of one or more loudspeakers of the wearable electronic device. For example, a unique ring tone can be selected for the covered mode of operation. The ring tone selected may be more audible through clothing. In another embodiment, step 1605 can include actuating a vibration mode 1904 of the wearable electronic device. In yet another embodiment, step 1605 can include adjusting one or more of a pitch, tone, spectral content, pattern, timbre, or combinations thereof 1905 of alert tones emitted by the wearable electronic device. For example, a ring tone could be spectrally altered to better penetrate through clothing.

In another embodiment, step 1605 can include providing an alert 1906 to the user. The alert, which may be in the form of a vibration, alert beep, or other indicator, can be configured to notify the user that clothing is obscuring the wearable electronic device. In another embodiment, step 1605 can include transmitting one or more notification messages 1907. For example, when incoming messages or calls are received, an automatic notification may be returned indicating that the user may not be aware that the incoming communication was received.

In yet another embodiment, step 1605 can include changing a voice mail message 1908 or sending automated replies to incoming communications 1909. A pre-recorded voice mail message may be changed from "I'm available but away from the phone," to "I'm in transit and cannot answer the phone." Such a change in a voice mail message may be dependent, in one embodiment, upon a contextual data comparison with expected contextual data. For example, if sensors in the wearable electronic device indicate that the user is outside of any building or dwelling, that the season is winter, and that the temperature of the device is substantially warmer than the expected ambient temperature, the wearable electronic device may conclude that the user is wearing a coat and in transit.

In another embodiment, step 1605 can include detecting nearby electronic devices 1910 and, where available, wirelessly delivering audio, video, or combinations thereof to another electronic device disposed within a near-field communication radius of the wearable electronic device. Accordingly, the user could see information normally presented on the display of the wearable device on another local device, e.g., a personal computer, without the need of removing a jacket or other garment.

In another embodiment, the nearby electronic devices 1910 may comprise audio or video or communication systems in a vehicle. For example, a user may be in a vehicle having audio output devices, video output devices, or built-in communication devices such as On-Star™ safety systems or mobile phones. In one embodiment, when covered, step 1605 can include detecting one or more of the vehicular systems and, where available, wirelessly delivering audio, video, or combinations thereof to another electronic device disposed within the vehicle.

In an alternate embodiment, the device may transfer communication control. For example, if the user is in a vehicle and the wearable electronic device is covered, step 1605 can include detecting nearby electronic devices 1910 and transferring functions to a complementary device. In this example, the wearable electronic device may forward phone functionality to the built-in phone system of the vehicle while the wearer is in the vehicle. When the device is uncovered, or when the user exits the vehicle, the wearable electronic device can reclaim any functionality that was delegated due to clothing coverage.

In yet another embodiment, step 1605 can include the actuation of new operating modes. For example, when the wearable electronic device is being worn and is covered, a near-field communication mode may be launched to locate audio or video output devices proximately located with the wearer. In yet another embodiment, sensors or electronic components can be deactuated 1913 in the wearable mode. For example, the display of the wearable electronic device may be turned OFF until the device is uncovered.

The examples above are illustrative only. Step 1605 can include other steps 1914 as well. For instance, where the wearable electronic device includes multiple microphones, step 1605 can include would select a microphone from the array that is least obscured or that provides the best performance. Alternatively, step 1605 can include enabling or disabling a touch-sensitive display, turning OFF backlighting features of a user interface or display, turning OFF unnecessary features or functions, disabling wireless links, and so forth. Other steps will be obvious to those of ordinary skill in the art having the benefit of this disclosure. In one or more embodiments, step 1605 occurs only where the wearable electronic device is fully covered, as a partially covered device may work fine without changing the operating mode.

Returning to FIG. 16, once the device mode or feature has been changed at step 1605, this mode of operation is continued, in one embodiment, at step 1606 for as long as the wearable electronic device is covered. When the device is uncovered, as detected at decision 1607, the device can return to a normal, uncovered operating mode at step 1608.

Figure 20:
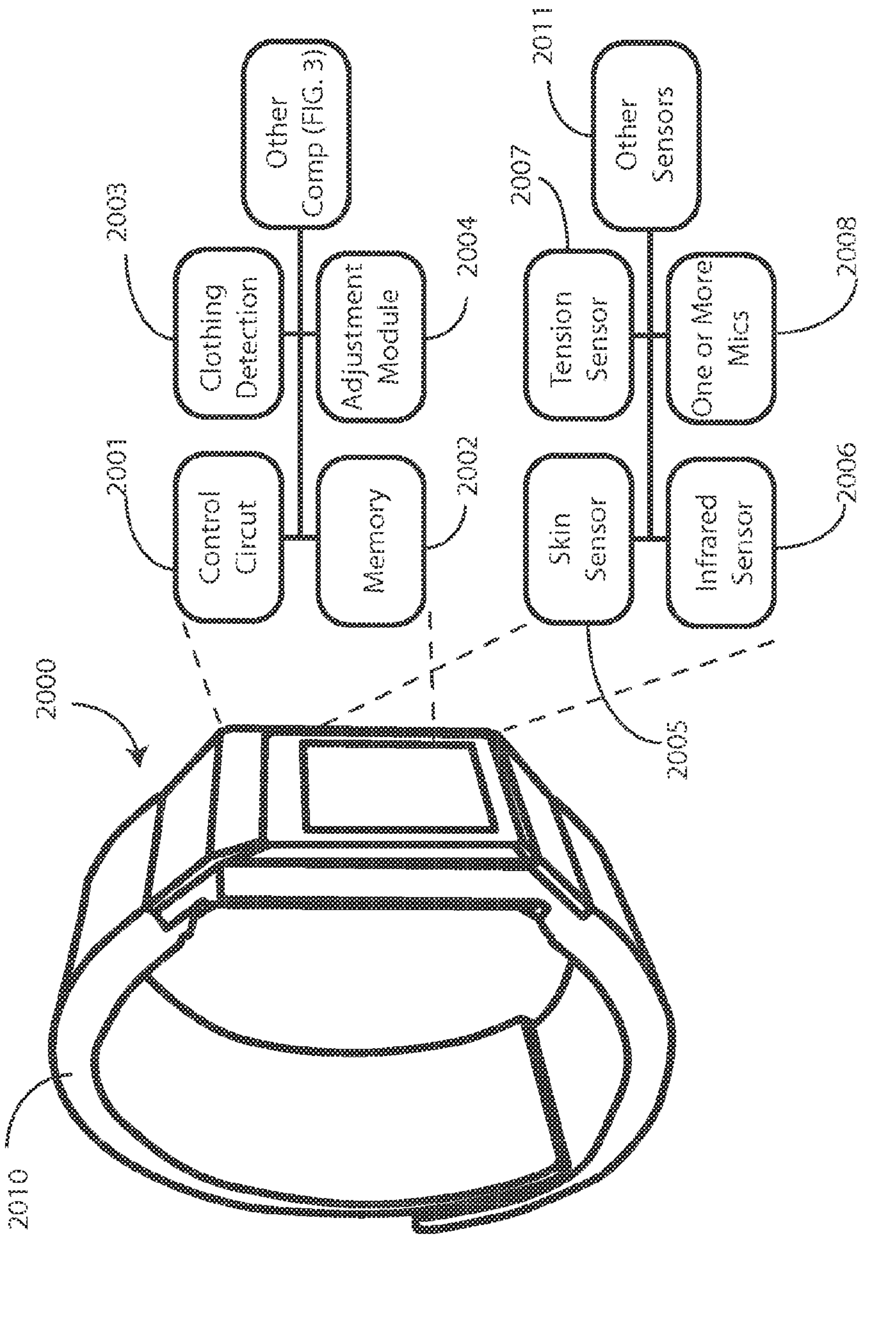
FIG. 20 illustrates one explanatory wearable electronic device configured in accordance with one or more embodiments of the invention.

Turning now to FIG. 20, illustrated therein is a schematic block diagram of a wearable electronic device 2000 configured to detect clothing coverage in accordance with one or more embodiments of the invention. Several of the components of FIG. 20 have been largely described in the preceding specification and thus will be only briefly discussed here.

A control circuit 2001 is disposed within the wearable electronic device 2000, and is operable with an associated memory 2002. A plurality of sensors 2011 is operable with the control circuit 2001. Examples of sensors 2011 include time sensors, temperature sensors, date sensors, environmental sensors, weather sensors, ultrasonic sensors, motion sensors, light sensors, location sensors, and so forth. These sensors are collectively shown as other sensors 2009 in FIG. 20.

In one embodiment, a skin sensor 2005 is configured to determine when the wearable electronic device 2000 is proximately located with the skin of a wearer. A tension sensor 2007 is configured to determine whether a strap 2010 of the wearable electronic device 2000 has a tension force applied in excess of a predetermined threshold, such as 0.25 lbs. An infrared sensor 2006 is configured to determine when the wearable electronic device is covered. One or more microphones 2008 are configured to detect an audio signature corresponding to a clothing object covering the wearable electronic device. Other sensors, subsets of these sensors, and so forth can be used in accordance with the methods described herein.

A clothing detection module 2003, which can be configured as executable code stored in the memory 2002 having instructions for the control circuit 2001, is operable with the control circuit 2001 and the sensors. In one embodiment the control circuit 2001 is configured to detect whether clothing is covering the wearable electronic device 2000, and also whether a wearer is wearing the wearable electronic device 2000. The clothing detection module 2003 can be configured to detect whether the wearable electronic device is coupled to a wearer, determine whether the wearable electronic device is covered, and confirm that the wearable electronic device is covered with clothing.

An adjustment module 2004 is configured to adjust one or more device settings of the wearable electronic device. This can include not engaging the display until the wearable electronic device is uncovered. Alternatively, this can include increasing the speaker gain to ensure the user could hear alerts, calls, and so forth. Still further, the adjustment can include selecting appropriate ring tones and alerts that are more audible through clothing. The adjustment can include selecting ring tones and alerts that are spectrally altered to better penetrate through clothing. The adjustment can include notifying the user that clothing is obscuring the wearable electronic device, with the notification being provided by a vibration signal, an alert beep, and so forth. The control circuit 2001 can employ the adjustment module 2004 to adjust one or more of these device output settings, in one embodiment, in response to the clothing detection module 2003 detecting whether the clothing is covering the wearable electronic device when the wearable electronic device is being worn by the wearer.

Figure 21:
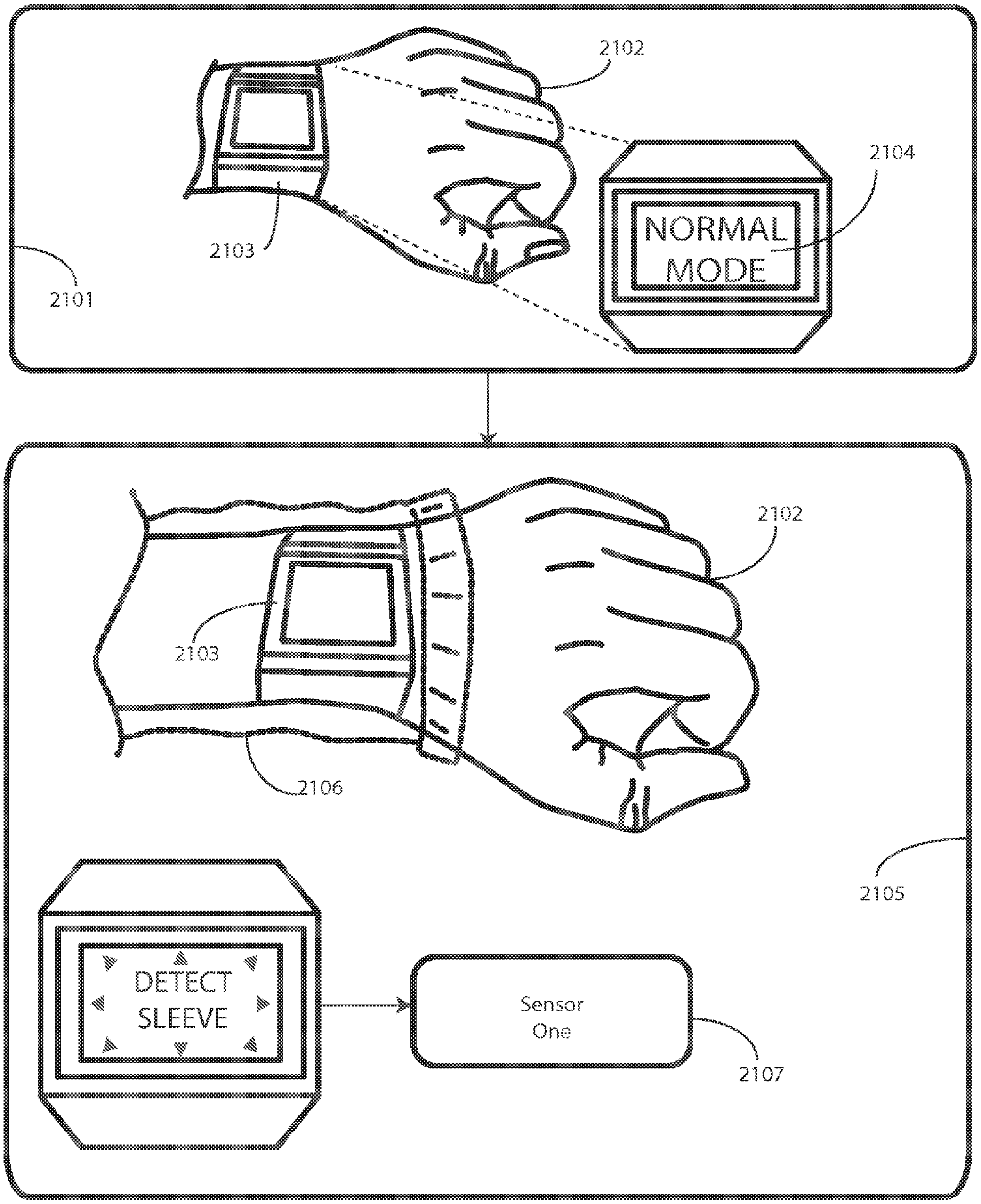
FIGS. 21-22 illustrate an explanatory use case for an illustrative wearable electronic device configured in accordance with one or more embodiments of the invention.
Figure 22:
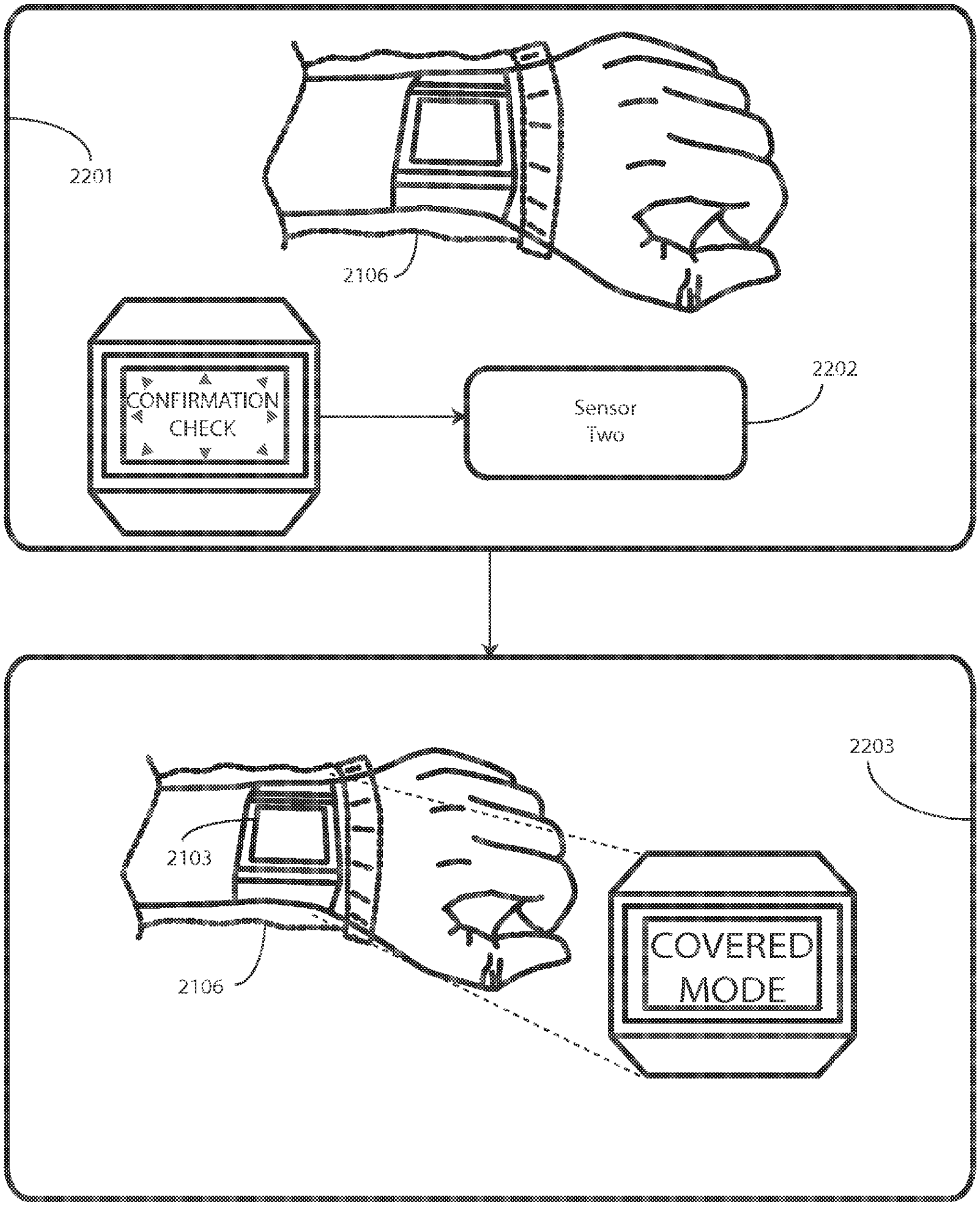

Turning to FIGS. 20 and 21, a simple use case is illustrated. At step 2101, a user 2102 has donned a wearable electronic device 2103. The wearable electronic device 2103 is uncovered and unobstructed. Accordingly, the wearable electronic device 2103 is operating in a normal operational mode.

At step 2105, the user 2102 has donned clothing 2106, which is completely covering the wearable electronic device 2103. A first sensor 2107, operable with a clothing detection module, is configured to determine whether the wearable electronic device 2103 is covered by an object. At step 2201, to increase the probability of accurately concluding that the object is indeed the clothing 2106, a second sensor 2202 performs a secondary check to obtain a positive indication that the object is the clothing 2106. In this illustrative embodiment, the first sensor 2107 and the second sensor 2202 are different. For example, the first sensor 2107 may be an infrared sensor, while the second sensor 2202 is a capacitive sensor configured to detect electrical conductivity.

At step 2203, the control circuit of the wearable electronic device 2103 is configured to adjust one or more device output settings of the wearable electronic device 2103 in response to the clothing detection module detecting whether the clothing 2106 is completely covering the wearable electronic device 2103 when the wearable electronic device 2103 is being worn by the user 2102.

As described, embodiments of the present invention device detect clothing covering a device and then automatically adjust one or more device settings appropriate for the current environment. One or more sensors and control circuits can determine whether a user is wearing a device and whether something is covering the device. Secondary checks can further confirm that the object is clothing. Where it is concluded that the device is covered with clothing, such as a coat sleeve, a control circuit can take the appropriate action to alter an operational state of the device.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method in a wearable electronic device of detecting clothing, comprising:

detecting, with at least a first sensor, whether the wearable electronic device is coupled to a wearer;

determining, with at least a second sensor, whether the wearable electronic device is covered;

in response to the determining, performing an additional determination, with at least a third sensor, of whether the wearable electronic device is covered with clothing; and wherein when the additional determination is positive, adjusting one or more device settings of the wearable electronic device.

2. The method of claim 1, wherein when the additional determination is negative, adjusting another of the one or more device settings of the wearable electronic device.

3. The method of claim 1, wherein the detecting comprises detecting with a tension sensor, a pressure sensor, or combination thereof, whether a strap of the wearable electronic device is applying a tension force to the wearable electronic device in excess of a predetermined threshold.

4. The method of claim 1, wherein the determining comprises sensing with one of an infrared sensor, an imager, or combinations thereof that an object is covering the wearable electronic device.

5. The method of claim 4, wherein the performing the additional determination comprises actuating one or more microphones to detect a noise profile corresponding to a clothing object covering the wearable electronic device.

6. The method of claim 1, wherein the determining comprises:

sensing, with the at least the second sensor, an object covering the wearable electronic device;

wherein the performing the additional determination comprises:

setting a timer; and allowing the timer to expire.

7. The method of claim 1, wherein the performing the additional determination comprises:

accessing contemporary contextual data of the wearable electronic device;

accessing expected contextual data based upon one or more of time, temperature, date, environment, about the wearable electronic device, weather within a predetermined vicinity of the wearable electronic device, motion of the wearable electronic device, illumination of the wearable electronic device, location of the wearable electronic device, operational mode of the wearable electronic device, or combinations thereof; and comparing the contemporary contextual data with the expected contextual data.

8. The method of claim 1, wherein the performing the additional determination comprises determining whether an object covering the wearable electronic device is electrically conductive.

9. The method of claim 1, wherein the adjusting occurs only where the wearable electronic device is fully covered.

10. The method of claim 1, wherein the adjusting comprises changing an output notification of one or more loudspeakers of the wearable electronic device.

11. The method of claim 1, wherein the adjusting comprises actuating a vibration mode of the wearable electronic device.

12. The method of claim 1, wherein the adjusting comprises wirelessly delivering audio, video, or combinations thereof to another electronic device disposed within a near-field communication radius of the wearable electronic device.

13. The method of claim 1, wherein the adjusting comprises transmitting one or more notification messages.

14. The method of claim 1, wherein the adjusting comprises adjusting one or more of a pitch, tone, spectral content, pattern, volume, timbre, or combinations thereof of alert tones emitted by the wearable electronic device.

15. The method of claim 1, wherein the adjusting comprises entering a power saving operational mode.

16. A wearable electronic device, comprising:

a control circuit disposed within the wearable electronic device;

a plurality of sensors operable with the control circuit; and a clothing detection module, operable with the control circuit and the plurality of sensors, and configured to detect whether clothing is covering the wearable electronic device when the wearable electronic device is being worn by a wearer.

17. The wearable electronic device of claim 16, wherein the clothing detection module is configured to:

detecting whether the wearable electronic device is coupled to the wearer;

determining whether the wearable electronic device is covered; and in response to the determining, confirming that the wearable electronic device is covered with clothing;

wherein the wearable electronic device further comprises an adjustment module configured to adjust one or more device settings of the wearable electronic device.

18. The wearable electronic device of claim 16, wherein the plurality of sensors comprise at least:

a sensor configured to determine when the wearable electronic device is proximately located with the wearer, wherein the sensor comprises one or more of a galvanic skin sensor, a moisture sensor, a biometric sensor, or an electrical conductivity sensor;

a tension sensor configured to determine whether a strap of the wearable electronic device has a tension force applied in excess of a predetermined threshold;

an infrared sensor configured to determine when the wearable electronic device is covered; and one or more microphones configured to detect an audio signature corresponding to a clothing object covering the wearable electronic device.

19. The wearable electronic device of claim 16, wherein the control circuit is configured to adjust one or more device output settings of the wearable electronic device in response to the clothing detection module detecting whether the clothing is covering the wearable electronic device when the wearable electronic device is being worn by the wearer.

20. The wearable electronic device of claim 16, wherein the clothing detection module is configured to determine whether the wearable electronic device is covered by an object with at least a first sensor, and to perform a secondary check to obtain a positive indication that the object is the clothing with at least a second sensor, wherein the at least the first sensor and the at least the second sensor are different.

* * * * *